US006262959B1

(12) United States Patent
Hashimoto

(10) Patent No.: US 6,262,959 B1
(45) Date of Patent: Jul. 17, 2001

(54) DISC CARTRIDGE

(75) Inventor: Keisuke Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/077,297

(22) PCT Filed: Oct. 2, 1997

(86) PCT No.: PCT/JP97/03535

§ 371 Date: Jul. 6, 1998

§ 102(e) Date: Jul. 6, 1998

(87) PCT Pub. No.: WO98/14941

PCT Pub. Date: Apr. 9, 1998

(30) Foreign Application Priority Data

Oct. 2, 1996 (JP) ........................................ P8-262040

(51) Int. Cl.[7] ........................................ G11B 23/03
(52) U.S. Cl. ........................................ 369/77.2; 369/291
(58) Field of Search ........................................ 369/77.2, 29.1, 369/75.1, 289, 290; 360/133, 99.02, 99.03, 99.06, 99.07

(56) References Cited

U.S. PATENT DOCUMENTS

| | | | | |
|---|---|---|---|---|
| 4,426,695 | * | 1/1984 | Moriki et al. | 369/77.2 |
| 5,140,489 | * | 8/1992 | Barnard | 360/133 |
| 5,208,802 | * | 5/1993 | Suzuki et al. | 369/289 |
| 5,475,674 | * | 12/1995 | Yamashita et al. | 369/291 |
| 5,610,902 | * | 3/1997 | Childers et al. | 369/289 |
| 5,724,332 | * | 3/1998 | Ogusu | 369/77.2 |
| 5,793,742 | * | 8/1998 | Sandell et al. | 369/291 |
| 5,936,927 | * | 8/1999 | Soga et al. | 369/75.1 |
| 5,936,935 | * | 8/1999 | Hanakawa et al. | 369/291 |
| 6,044,058 | * | 3/2000 | Miyazaki et al. | 369/291 |

FOREIGN PATENT DOCUMENTS 08-7429 1/1996 (JP) .

* cited by examiner

*Primary Examiner*—David L. Ometz
*Assistant Examiner*—Angel Castro
(74) *Attorney, Agent, or Firm*—Jay H. Maioli

(57) ABSTRACT

A recording and/or reproducing apparatus comprises a holder provided with an engagement portion with which there is engaged a portion of a shutter opening mechanism provided at the recording and/or reproducing apparatus side at insertion end side into the recording and/or reproducing apparatus, and a tray movably held with respect to the holder and provided with a disc mounting portion. The tray is adapted so that when there is the state where at least the engagement portion is engaged with the shutter opening mechanism, the tray is permitted to be moved with respect to the holder so that drawing operation from the recording and/or reproducing apparatus can be made. At the tray, there is provided a releasing portion for releasing engagement with respect to the engagement portion of the holder of the shutter opening mechanism in the state positioned at the insertion end side into the recording and/or reproducing apparatus. The engagement releasing portion is adapted so that when the disc mounting portion is moved to the position at which the disc mounting portion is covered by the holder, it releases engagement with respect to the engagement portion of the shutter opening mechanism.

17 Claims, 21 Drawing Sheets

DISC CARTRIDGE

TECHNICAL FIELD

This invention relates to a disc cartridge adapted for exchangeably accommodating discs such as optical disc or magneto-optical disc, etc. which serves as a recording medium of information signals, and more particularly to a disc cartridge for permitting loading with respect to a disc recording and/or reproducing apparatus to which disc cartridge having shutter for opening or closing an opening portion which allows the disc to be faced toward the external of the disc in place of the disc cartridge.

BACKGROUND ART

Hitherto, there are used discs such as optical disc or magneto-optical disc, etc. as recording medium of information signals.

In the disc of this kind, there are discs in which loading with respect to disc recording and/or reproducing unit is carried out by the disc alone and there are discs in which disc is accommodated within the disc cartridge and loading with respect to the disc recording and/or reproducing unit is carried out in the state where the disc is accommodated within this disc cartridge.

As disc recording and/or reproducing unit adapted for carrying out loading by the disc alone without being accommodated into the disc cartridge, there are used disc recording and/or reproducing unit of the tray loading system using disc tray.

The disc recording and/or reproducing unit of the tray loading system comprises, as shown in FIG. 1, a disc tray 203 for carrying out loading of disc 202 handled by the disc alone with respect to the unit body 201. The disc tray 203 is adapted so that a recess shaped disc mounting portion 204 on which the disc 202 is mounted is provided at one surface side, and is provided so that it can be moved within the range between a first position at which the disc mounting portion 204 is projected toward the external of the unit body 201 through an opening portion 205 provided at the unit body 201 and a second position in which the disc mounting portion is accommodated within the unit body 201.

In order to carry out loading of the disc 202, the disc tray 203 is moved from the unit body 201 to the first position of the external of the unit body 201 to mount the disc 202 on the disc mounting portion 204. Then, the disc tray 203 is moved to the second position within the unit body 201, whereby the disc 202 mounted on the disc mounting portion 204 is caused to undergo loading with respect to the recording and/or reproducing unit provided within the unit body 201.

In this way, in the disc recording and/or reproducing apparatus adapted so that disc 202 is caused to undergo loading by the disc alone, there is the possibility that disc 202 may be damaged during loading. When the disc 202 is damaged, missing in recording/reproduction of information signals is caused to take place.

In order to realize protection of the disc 202, a disc cartridge 211 adapted for accommodating this disc 202 is used. This disc cartridge 211 serves to exchangeably accommodate the disc 202, and comprises, as shown in FIG. 2, a cartridge body 212 for accommodating the disc 202, and a cover body 214 for opening/closing the opened side for carrying out insertion/withdrawal of disc 202 provided at the cartridge body 212. At a bottom surface portion 212*a* of the cartridge body 212, a disc mounting portion 215 on which disc 202 is mounted is provided, and the disc 202 is accommodated in the state mounted on the disc mounting portion 215. At the bottom surface portion 212*a* of the cartridge body 212, there is provided an opening portion 216 for allowing the portion extending from the central portion of the disc 202 toward the outer circumferential side to be faced to the external. The disc 202 accommodated within this disc cartridge 211 can be desirably exchanged by opening the cover body 214.

As the disc recording and/or reproducing apparatus using the disc cartridge 211 which has accommodated the disc 202 in this way, there is used an apparatus of the slot-in system which can directly carry out loading of the disc cartridge 211 into the unit body without using the disc tray. As shown in FIG. 3, this disc recording and/or reproducing apparatus of the slot-in system serves to carry out loading of the disc cartridge 211 through a cartridge insertion/withdrawal hole 222 provided at the front side of the unit body 221.

Meanwhile, there are instances where user desires to carry out loading by the disc alone in order to realize promptly or easiness of loading operation in discs of a certain kind such as optical disc of the reproduction only type, etc. In view of the above, there has been proposed a disc recording and/or reproducing apparatus which permits disc 202 to undergo loading by disc alone along with disc cartridge 211 which has accommodated the disc 202 therewithin. This disc recording and/or reproducing apparatus is the apparatus employing the tray loading system. As shown in FIG. 4, this disc recording/reproducing apparatus includes a disc tray 232 provided with a cartridge mounting portion 231 on which disc 202 or disc cartridge 211 can be mounted. This disc tray 232 is movably disposed within the range between first position at which cartridge mounting portion 231 provided at one surface side is projected toward the external of the unit body 234 and second position at which the cartridge loading portion 231 is accommodated within the unit body 234.

In this disc recording and/or reproducing apparatus, in order to allow disc cartridge 211 which has accommodated the disc 202 to undergo loading, disc cartridge 211 is mounted on the cartridge mounting portion 231 to move the disc tray 232 to second position within the unit body 233, whereby the disc cartridge 211 mounted on the cartridge mounting portion 231 is loaded with respect to the cartridge loading portion within the unit body 234 so that disc 202 accommodated within the disc cartridge 211 is loaded with respect to the recording and/or reproducing unit.

Moreover, in the case where the disc 202 is loaded by disc alone, disc 202 is mounted on the disc mounting portion provided within the cartridge loading portion 231 to move the disc tray 232 to the second position within the unit body 233, whereby the disc 202 mounted on the disc mounting portion is loaded with respect to the recording and/or reproducing section provided within the unit body 234.

Both the disc alone and the cartridge are permitted to undergo loading, whereby loading corresponding to kind of disc can be selected. Thus, improvement in the operability can be realized. However, in the case of carrying out loading of disc without accommodating it into the disc cartridge, it is difficult to prevent attachment of dust onto the disc thus to securely prevent so that the disc is damaged.

In order to realize reliable protection of the disc, it is desirable to accommodate it within the disc cartridge.

Meanwhile, in the disc cartridge 211 which has exchangeably accommodated the above-described disc 202, in order to carry out exchange of the disc 202, it is necessary to once eject the disc from the disc recording and/or reproducing unit to carry out opening/closing operation of the cover body 214 to carry out exchange with other disc 202. As a result, the exchange work becomes complicated.

In order to reduce the exchange work of the disc 202 or to eliminate such exchange work, it is necessary to prepare disc cartridges 211 corresponding to the number of discs 202. As a result, a large space is required for storage of the disc 202.

DISCLOSURE OF THE INVENTION

An object of this invention is to provide a disc cartridge capable of exchanging the disc in the state where it is loaded with respect to a recording and/or reproducing unit for the purpose of easily exchanging the disc.

Another object of this invention is to provide a disc cartridge capable of carrying out loading in place of this disc cartridge with respect to a disc recording and/or reproducing apparatus to which there is caused to undergo loading disc cartridge having shutter which opens or closes an opening portion for allowing disc conventionally proposed or used to be faced toward the external.

A further object of this invention is to provide a disc cartridge capable of exchanging disc in the state where disc cartridge is loaded with respect to the recording and/or reproducing unit as it is, capable of easily taking out, from the recording and/or reproducing apparatus, the entirety of disc cartridge along with the disc, and capable of allowing other disc cartridge to quickly undergo loading with respect to the recording and/or reproducing apparatus.

A still further object of this invention is to provide a disc cartridge capable of safely and securely carrying out exchange work of disc which has been accommodated.

A still more further object of this invention is to provide a disc cartridge which can realize reliable protection of the disc while easily permitting exchange of the disc.

A disc cartridge according to this invention proposed for the purpose of attaining objects as described above can be loaded with respect to a recording and/or reproducing apparatus adapted so that there is loaded a disc cartridge adapted so that disc serving as a recording medium of information signals is accommodated, an opening portion for allowing a portion of the disc to be faced toward the external along the radial direction is provided, and a shutter for opening/closing the opening portion is attached, and comprises a holder provided with an engagement portion with which there is engaged a portion of a shutter opening mechanism provided at the recording and/or reproducing apparatus side in the state positioned at the insertion end side into the recording and/or reproducing apparatus, and a tray movably held with respect to the holder and provided with a disc mounting portion on which disc serving as a recording medium of information signals is mounted is provided at one surface side covered by the holder. Further, the tray is adapted so that when there is the state where at least the engagement portion is engaged with the shutter opening mechanism, the tray can be moved with respect to the holder and drawing operation from the recording and/or reproducing apparatus can be made.

At the tray, there is provided a releasing portion for releasing engagement with the engagement portion of the holder of the shutter opening mechanism in the state positioned at the insertion end side into the recording and/or reproducing apparatus. This engagement releasing portion is adapted so that when the tray is moved with respect to the holder so that it is located at position where the disc mounting portion is covered by the holder, it releases engagement with respect to the engagement portion of the shutter opening mechanism.

At the tray, there are provided plural disc supporting members for supporting disc mounted on the disc mounting portion in the state positioned at the outer periphery of the disc mounting portion, thus to prevent slipping off of the disc mounted on the disc mounting portion.

Further, guide means for guiding movement with respect to the holder of the tray is provided between the holder and the tray. Thus, stable movement with respect to the holder of the tray is realized.

Further, between the holder and the tray, there is provided a slipping off prevention mechanism for preventing slipping off from the holder of the tray when at least the tray is drawn to the position at which loading/unloading of the disc on the disc mounting portion covered by the holder can be made. Accordingly, easy slipping off from the holder of the tray is prevented. Thus, reliable protection of the disc mounted on the disc mounting portion is realized.

Further, between the holder and the tray, there is provided a movement limiting mechanism such that when the holder and the tray are caused to overlap with each other at the position where the disc mounting portion is covered, they are relatively engaged with each other to limit relative movement between the holder and the tray. Thus, reliable protection of disc mounted on the disc mounting portion is realized.

Furthermore, at the tray, there is provided grasp portion which can be independently grasped with respect to the holder at one end side opposite to insertion end side into the recording and/or reproducing apparatus. Thus, only the tray is drawn from the recording and/or reproducing apparatus so that exchange of disc can be made.

In addition, at the holder, there is provided, at one end side opposite to insertion end side into the recording and/or reproducing apparatus, a grasp portion which can be grasped integrally with the tray when the holder and the tray overlap with each other at position where they cover the disc mounting portion to grasp this grasping portion to draw out it to thereby draw out the holder and the tray in one body from the recording and/or reproducing unit, thus permitting other disc cartridge to undergo loading with respect to the recording and/or reproducing unit.

Still further objects of this invention and more practical merits obtained by this invention will become more clear from the explanation of the embodiments which will be described below.

BEST MODE FOR CARRYING OUT THE INVENTION

A disc cartridge according to this invention will now be described with reference to the attached drawings.

The disc cartridge according to this invention is permitted to undergo loading into the disc recording and/or reproducing unit in which disc cartridge which can exchange conventionally proposed disc is loaded in place of this disc cartridge.

Initially, first disc cartridge 1 conventionally proposed which is loaded with respect to the disc recording and/or reproducing apparatus in which disc cartridge according to this invention is loaded will be described.

Figure 1:
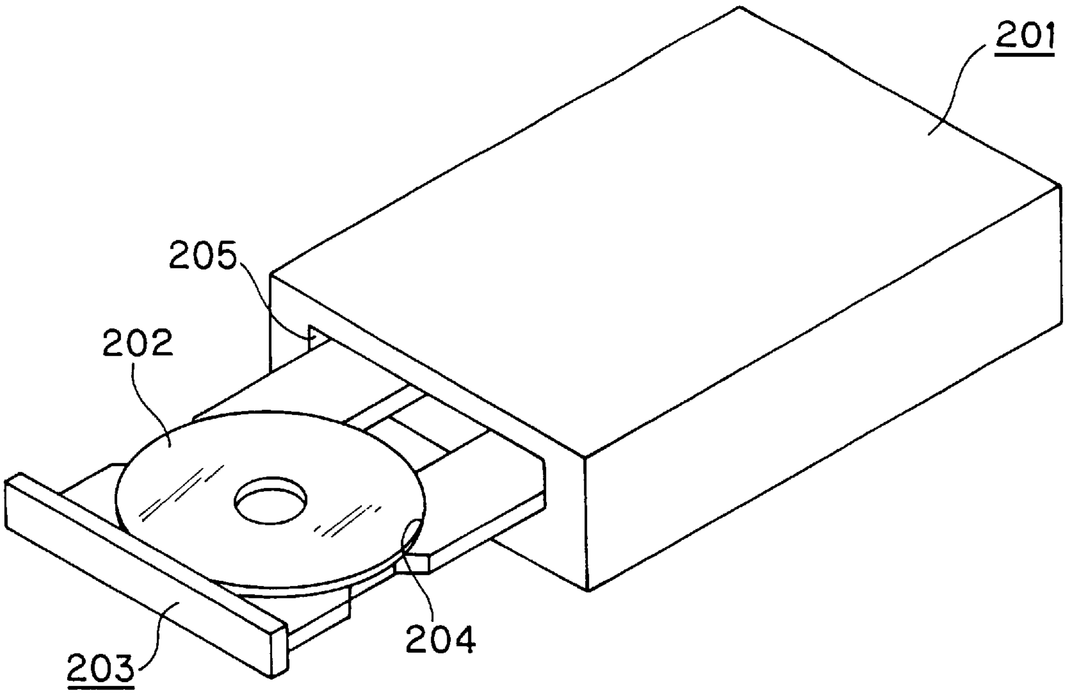
FIG. 1 is a perspective view showing a disc recording and/or reproducing apparatus adapted for allowing disc to undergo loading by disc alone.
Figure 2:
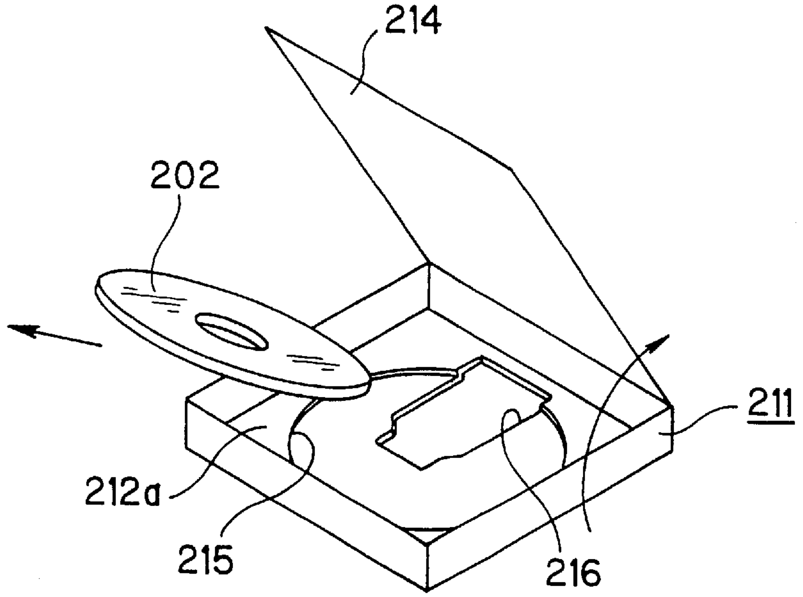
FIG. 2 is a perspective view showing a conventional disc cartridge adapted for exchangeably accommodating disc therewithin.
Figure 3:
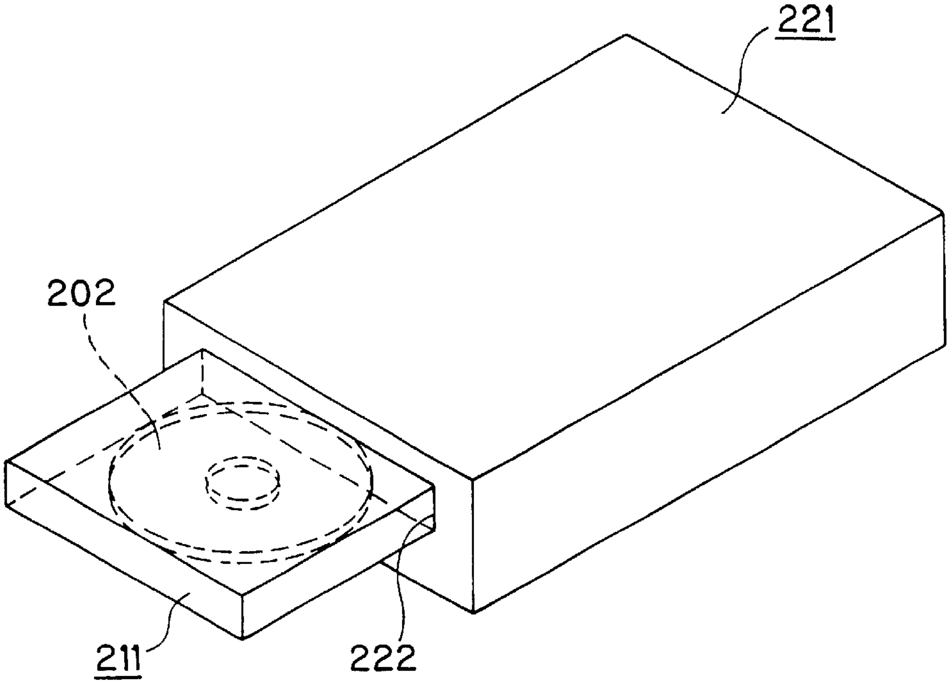
FIG. 3 is a perspective view showing a disc recording and/or reproducing apparatus employing the slot-in system.
Figure 4:
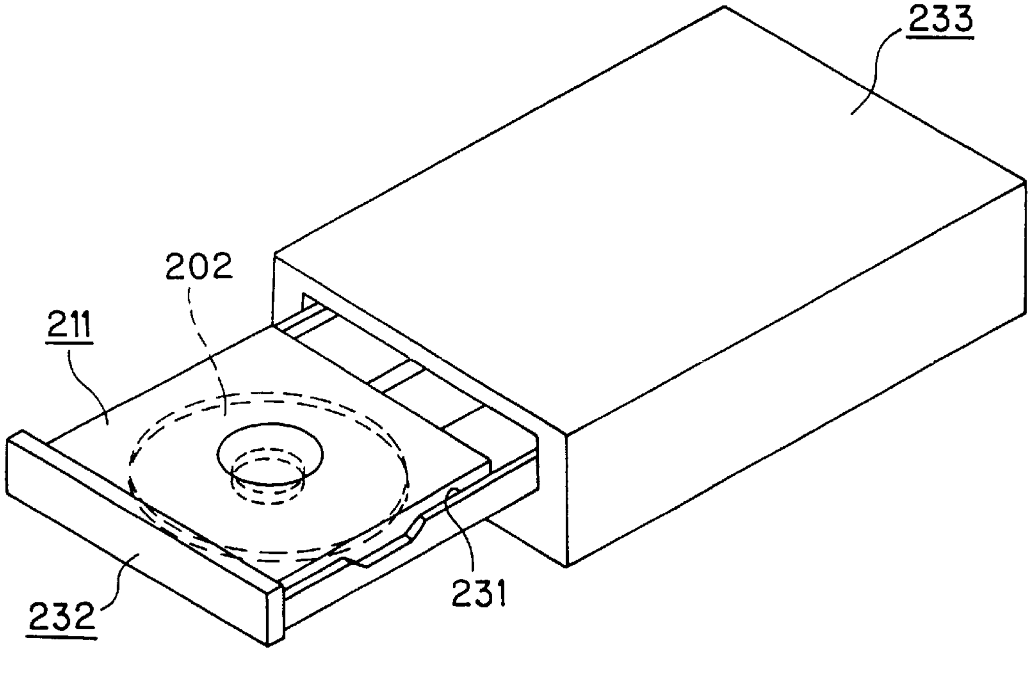
FIG. 4 is a perspective view showing a disc recording and/or reproducing apparatus which permits loading of disc alone and disc cartridge.
Figure 5:
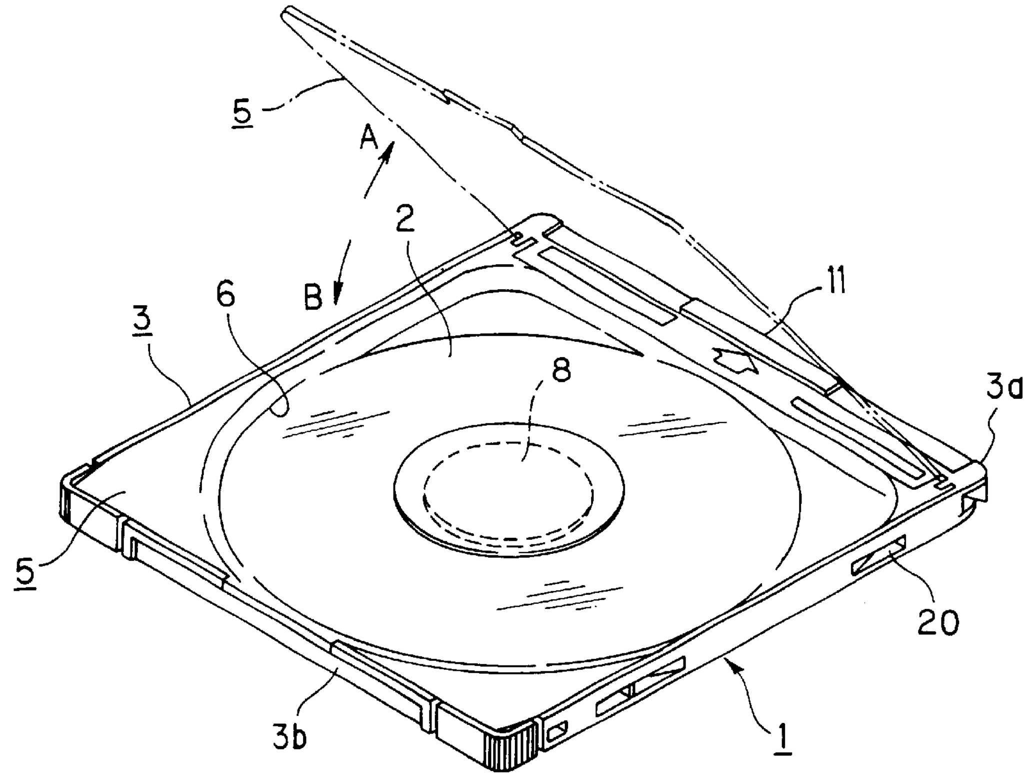
FIG. 5 is a perspective view showing first disc cartridge conventionally proposed.
Figure 6:
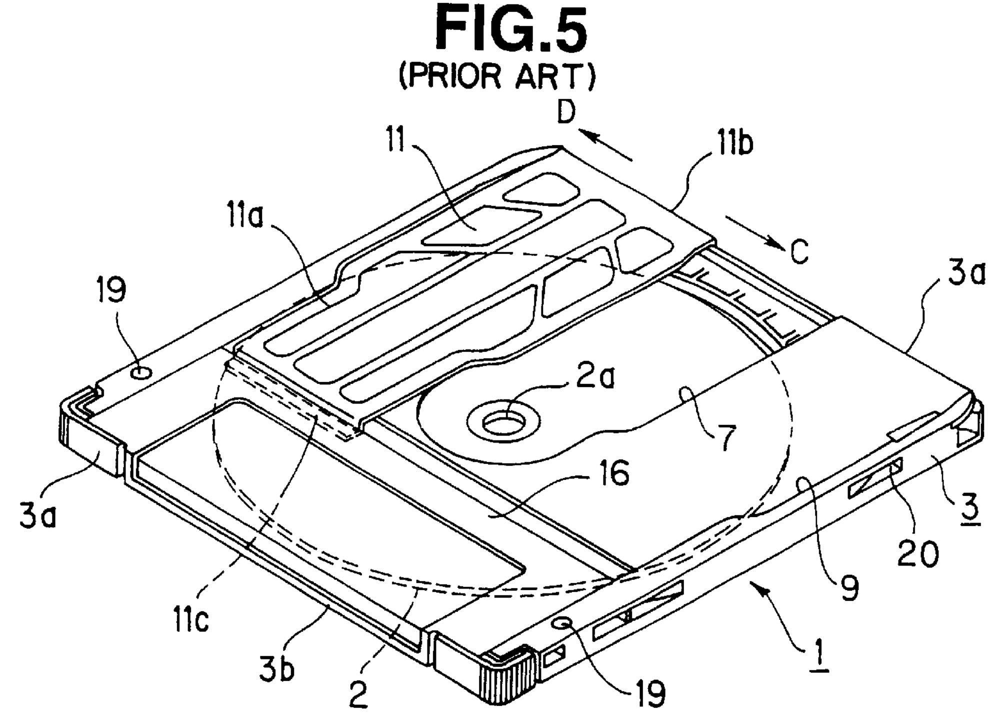
FIG. 6 is a perspective view when the state where shutter provided at first disc cartridge is opened is viewed from the bottom surface side.

As shown in FIGS. 5 and 6, the first disc cartridge 1 serves to exchangeably accommodate optical disc 2 of reproduction only type in which information signals are recorded in advance, or optical disc 2 which permits write operation of information signals. The optical disc 2 accommodated within this disc cartridge 1 is such that diameter is caused to be 12 cm and a center hole 2$a$ is provided at the central portion.

The first disc cartridge 1 includes a rectangular cartridge body 3 formed by using opaque synthetic resin, and a cover body 5 for opening/closing one surface side of this cartridge body 3 substantially over the entire area.

Substantially at the central portion of one surface side opened or closed by cover body 5 of cartridge body 3, there is provided a disc mounting portion 6 which form recessed shape on which optical disc 2 is mounted in a such a manner that it is accommodated. At the bottom surface portion of this disc mounting portion 6, as shown in FIG. 6, there is formed an opening portion 7 for allowing the area from the central portion where the center hole 2$a$ of the optical disc 2 accommodated within the cartridge body 3 is provided toward the outer circumferential side to be faced toward the external. At this opening portion 7, when the first disc cartridge 1 is loaded with respect to the disc recording and/or reproducing apparatus, there is faced disc table and optical pick-up of the disc rotational operation mechanism constituting the recording and/or reproducing unit provided at the recording and/or reproducing unit side.

The cover body 5 is formed so as to take plate shape by using transparent synthetic resin, and is adapted so that support shafts (not shown) projected on the both sides of the base end portion side are pivotally supported at pivotal supporting portions provided on both sides of the insertion end side into the disc recording and/or reproducing unit of the cartridge body 3, and is rotatably supported in the direction indicated by arrow A or in the direction indicated by arrow B in FIG. 5 with these pivotal portions being as center. Between the cover body 5 and the cartridge body 3, there is provided a lock mechanism for holding the cover body 5 with respect to the cartridge body 3 when the cover body 5 is rotated in the direction indicated by arrow B in FIG. 5 to close the disc mounting portion 6 although not shown.

The cover body 5 which closes the disc mounting portion 6 releases holding with respect to the cartridge body 3, and rotates the pivotal supporting portion in the direction indicated by arrow B in FIG. 5 with the pivotal supporting portions being as center, thereby making it possible to open the disc mounting portion 6. As the result of the fact that the disc mounting portion 6 is opened, exchange of the optical disc 2 accommodated within the cartridge body 3 can be carried out.

At the central portion of the internal surface side opposite to the disc mounting portion 6 of the cover body 5, there is rotatably attached a clamping member 8 for clamping the optical disc 2 mounted on the disc mounting portion 6 in cooperation with the disc table of the disc rotational operation mechanism provided at the recording and/or reproducing unit side when the first disc cartridge 1 is loaded with respect to the disc recording and/or reproducing unit. At this clamping member 8, magnetic plate such as metallic plate, etc. is provided. The magnetic plate is attracted by magnet provided at the disc table side to clamp the optical disc 2.

Figure 7:
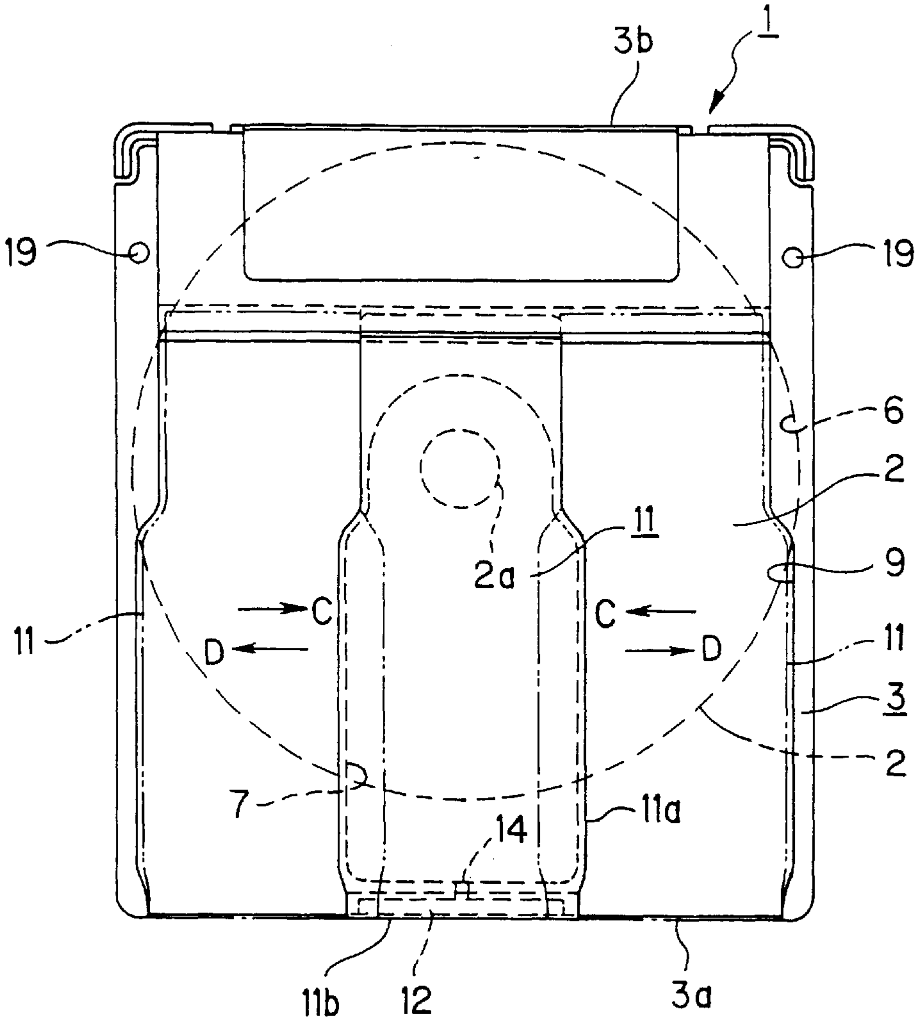
FIG. 7 is a plan view of the first disc cartridge.

Further, at the other surface side facing to the external of the cartridge body 3, as shown in FIGS. 6 and 7, there is formed a recess shaped shutter slide portion 9 in a broad area extending toward left and right both side surfaces of the cartridge body 3 in such a manner extending to the position including one end surface 3*a* serving as insertion end into the disc recording and/or reproducing unit and close to the other end surface 3*b*. At the shutter slide portion 9, a shutter 11 which opens or closes the opening portion 7 is disposed. This shutter 11 is formed by using thin metal plate such as stainless steel, etc., and includes a substantially rectangular shutter portion 11*a* having a size (dimensions) sufficient to close the opening portion 7, wherein an attachment portion 11*b* bent so as to take channel shape in cross section is provided at one end side of the shutter portion 11*a*.

Figure 8:
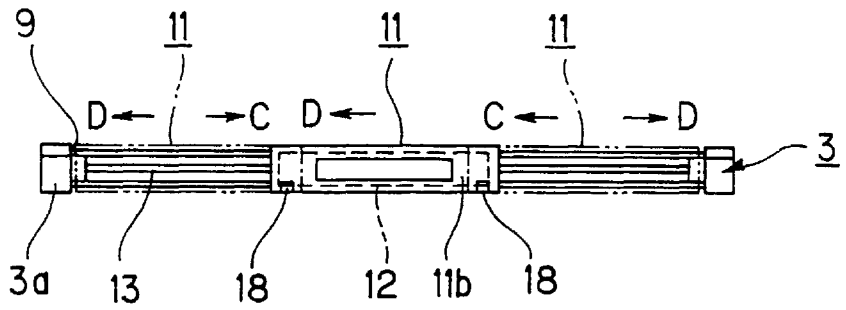
FIG. 8 is a plan view of first disc cartridge showing mounting state of shutter.

At the shutter 11, the attachment portion 11*b* is fixed to the slide member 12 disposed so that it can be moved in the direction indicated by arrow C and in the direction indicated by arrow D in FIGS. 6 and 8 in the state positioned at one end surface 3*a* side of the cartridge body 3 in a manner such that the attachment portion 11*b* is fitted with respect to one side surface 3*a* side of the cartridge body 3, whereby the shutter 11 moves in the direction indicated by arrow C and in the direction indicated by arrow D in FIGS. 6 and 8 in one body with the slide member 12 to thereby open or close the opening portion 7.

The slide member 12 is supported by a guide shaft 13 disposed at one end surface 3*a* side within the cartridge body 3, and moves in the direction indicated by arrow C and in the direction indicated by arrow D in FIGS. 6 and 8 in the state guided by this guide shaft 13.

In this example, the shutter 11 is biased in the direction indicated by arrow C in FIGS. 6 and 8 to close the opening portion 7 by extension coil spring (not shown) for biasing the slide member 12, and is caused to be in contact with the stopper 14 formed at the cartridge body 3 so that it is held at the position where the opening portion 7 is closed as shown in FIG. 7.

The shutter 11 is inserted with respect to the lower surface side of the slide guide plate 16 in which the front end portion 11*c* of the shutter portion 11*a* is disposed in a manner extending in movement direction of the shutter 11 at the other surface side of the cartridge body 3. The shutter 11 is adapted so that the front end portion 11*c* of the shutter portion 11*a* is supported by the slide guide plate 16 so that it is limited that the shutter 11 floats from the shutter slide portion 9. Thus, the shutter 11 can be moved in a direction to open or close the opening portion 7 in a stable state.

At the surface opposite to one end surface 3*a* of the cartridge body 3 of the attachment portion 11*b* formed at the shutter 11, as shown in FIG. 8, there are formed, by cutting, a pair of opening/closing pin engagement portions 18, 18 with which there is engaged a shutter opening/closing pin constituting the shutter opening/closing mechanism provided at the disc recording and/or reproducing unit side in which the first disc cartridge 1 is loaded.

Further, at the other surface side in which opening portion 7 of the cartridge body 3 is formed and at both sides of the other end surface 3*b* side, there are provided, as shown in FIGS. 6 and 7, a pair of positioning pin engagement holes 19, 19 with which positioning pins provided at the cartridge loading portion are engaged when the first disc cartridge 1 is loaded with respect to the cartridge loading portion of the disc recording and/or reproducing unit.

Figure 9:
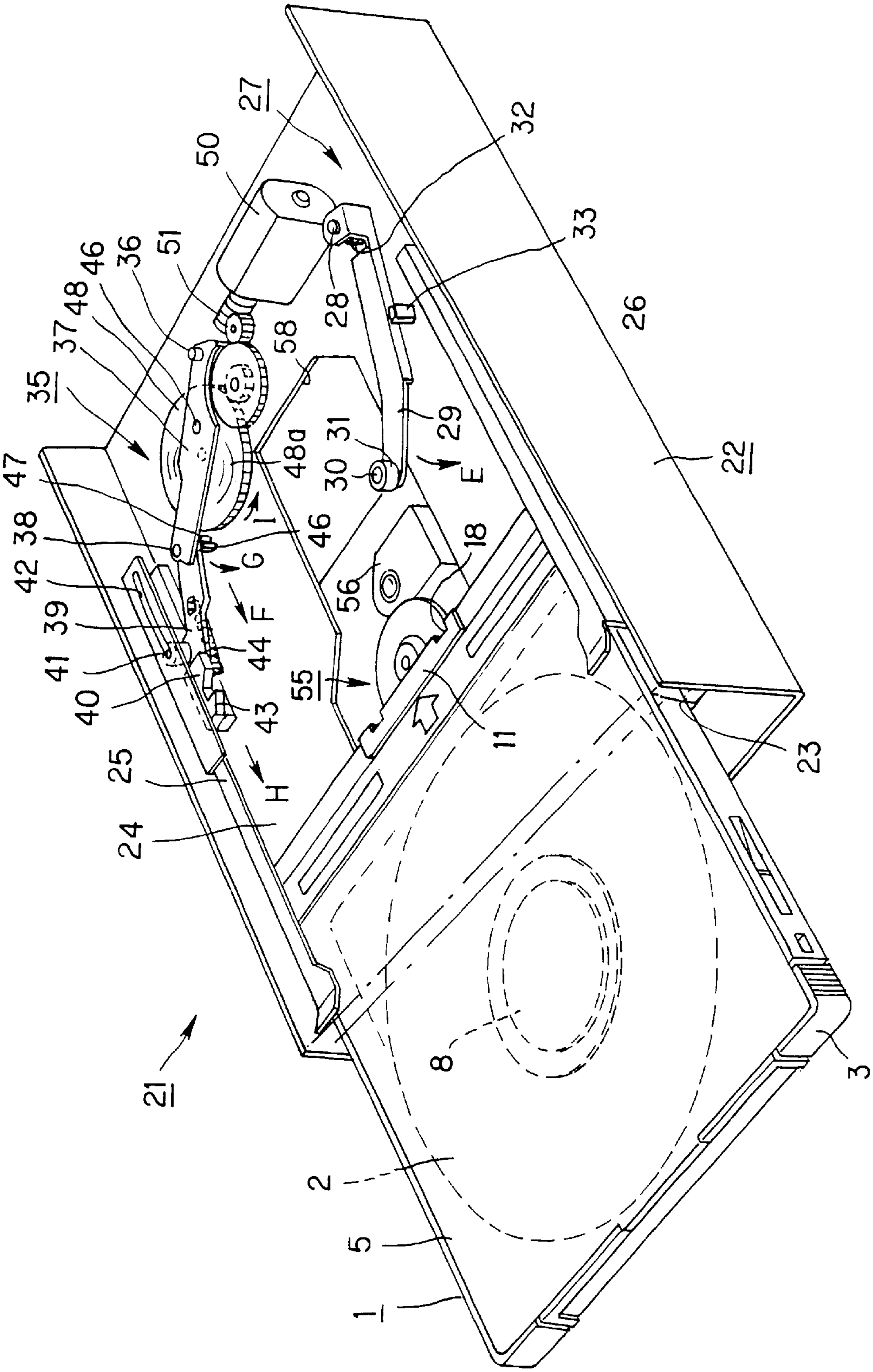
FIG. 9 is a perspective view showing disc recording and/or reproducing apparatus in which first disc cartridge is used.

Moreover, at the both sides of one end surface 3*a* side serving as insertion end into the disc recording and/or reproducing unit of the cartridge body 3, there are provided, as shown in FIG. 6, engagement recessed portions 20 in which engagement pawl of the cartridge drawing mechanism provided at the disc recording and/or reproducing unit side is engaged. The first disc cartridge 1 is adapted so that when it is inserted by a predetermined quantity with respect to the disc recording and/or reproducing unit, the engagement pawl of the cartridge drawing mechanism is engaged with the engagement recessed portion 20, whereby loading with respect to the cartridge loading portion is automatically carried out by drive of the cartridge drawing mechanism, The disc recording and/or reproducing unit 21 in which the first disc cartridge 1 constituted as described above is loaded is adapted so that cartridge insertion/withdrawal hole 23 is provided at the front side of the unit body 22 as shown in FIG. 9, whereby insertion/withdrawal of the disc cartridge 1 is carried out through this cartridge insertion/withdrawal portion 22. Namely, this disc recording and/or reproducing unit 21 is constituted as an apparatus adapted for carrying out loading of the slot-in system.

Within the unit body 22, there is disposed a cartridge holding plate 24 for holding the disc cartridge 1 inserted within the unit body 22 through the cartridge insertion/withdrawal hole 23. The cartridge holding plate 24 is adapted so that, at the side where the cartridge holding plate 24 is formed by metal plate, there are provided cartridge holding portions 25, 26 channel-shaped in cross section in which both sides of the disc cartridge 1 inserted into the unit body 22 are engaged on both sides opposite to each other. The disc cartridge 1 inserted into the unit body 22 is held at both sides by cartridge holding portions 25, 26, and is inserted into the unit body 22 in the state where insertion direction into these cartridge holding portions 25, 26 is guided.

At the internal side of the unit body 22, there is provided a shutter opening/closing mechanism 27 in such a manner that it is opposite to insertion end in which shutter 11 of the disc cartridge 1 inserted into the unit body 22 through cartridge insertion/withdrawal hole 23 is attached. The shutter opening/closing mechanism 27 comprises a rotational arm 29 for allowing the base end portion to be supported by support shaft 28 vertically provided on the cartridge holding plate 24 and rotatably attached with this support shaft 28 being as center, and is adapted so that opening/closing pin 30 engaged with the opening/closing pin engagement portion 18 provided at the shutter 1 of the first disc cartridge 1 is vertically provided at the front end side of the rotational arm 29. A roller 31 is fitted with respect to the shutter opening/closing pin 30. The rotational arm 29 is rotationally biased in the direction indicated by arrow E in FIG. 9 by torsional coil spring 32 wound on the support shaft 28. The rotational biasing position of the rotational arm 29 is limited in such a manner that one side surface thereof is caused to be in contact with the rotational limiting piece 33 provided at the cartridge holding plate 24. At this time, the opening/closing pin 30 is opposed to one opening/closing engagement portion 18 provided at the shutter 11 of the first disc cartridge 1 inserted on the cartridge holding plate 24.

Further, at the internal side of the unit body 22, there is provided a cartridge drawing mechanism 35 engaged with the first disc cartridge 1 inserted into the unit body 22 by a predetermined quantity and adapted for further carrying out drawing operation of the disc cartridge 1 toward the internal of the unit body 22. This cartridge drawing mechanism 35 comprises, as shown in FIG. 9, a first rotational lever 37 for allowing the base end portion to be supported by a support shaft 36 vertically provided on the cartridge holding plate 24 and rotatably attached with the support shaft 36 being as center, a second rotational lever 39 rotatably connected through a support shaft 38 at the front end side of this first rotational lever 37, and a cartridge engagement member 40 attached to the front end side of the second rotational lever 39. At the front end side of the second rotational lever 39, an engagement pin 41 is vertically provided. This engagement pin 41 is engaged with an engagement groove 42 bored in slightly bent manner along insertion/withdrawal direction of the disc cartridge 1 with respect to one cartridge holding portion 25 provided at the cartridge holding plate 24. The second rotational lever 39 is adapted so that the engagement pin 41 is engaged with the engagement groove 42, whereby when the first rotational lever 37 is rotated with the support shaft 36 being as center, the engagement pin 41 is rotated with the support shaft 38 being as center so that the front end side in which the engagement pin 41 is vertically provided moves in a direction substantially in parallel to the cartridge holding portion 25 to move the cartridge engagement member 40 attached at the front end side in a direction substantially in parallel to insertion/withdrawal direction of the disc cartridge 1.

The cartridge holding member 40 is formed by molding synthetic resin, and is adapted so that an engagement pawl 43 engaged with the engagement recessed portion 20 provided at one side of the first disc cartridge 1 is provided at the front end side, and the base end portion side is supported by the engagement pin 41, and is rotatably attached with this engagement pin 41 being as center. Moreover, the cartridge holding member 40 is adapted so that an engagement pawl 43 at the front end side is rotationally biased by an extension spring 44 stretched between the base end portion side of this cartridge holding member 40 and the second rotational lever 39 in the direction indicated by arrow F in FIG. 9 which is the direction projected toward the internal of the cartridge holding portion 25.

Further, the first rotational lever 37 is rotationally biased in the direction indicated by arrow G in FIG. 9 by torsion coil spring (not shown) wound on the support shaft 36. The first rotational lever 37 is adapted so that the rotational biasing position is limited by torsion coil spring 46 by allowing a contact piece 47 provided at the front end side to be in contact with the rotational limiting piece 46 formed by raising a portion of the cartridge holding plate 24. The first rotational lever 37 is rotationally biased in the direction indicated by arrow G in FIG. 9, whereby the second rotational lever 39 is moved in the direction indicated by arrow H in FIG. 9 in which the cartridge engagement member 40 of the front end side is moved toward the cartridge insertion/withdrawal hole 23 side.

When the cam plate 48 rotatably attached on the cartridge holding plate 24 is rotationally operated, the first rotational lever 37 is rotated in the direction opposite to the direction indicated by arrow G in FIG. 9 against the biasing force of the extension spring 44, or is rotated in the direction indicated by arrow G in FIG. 9 which has caused to undergo biasing force of the extension spring 44. The first rotational lever 37 is related to the cam plate 48 by allowing the cam follower 45 (not shown) provided at the middle portion to be engaged with a cam groove 48*a* formed at one surface of the cam plate 48.

The cam plate 48 is rotationally operated by a drive motor 50 attached at the cartridge holding plate 24, is connected to the output shaft of the drive motor 50 through connection gear mechanism 51, and is rotationally operated in correspondence with rotational direction of the drive motor 50.

Further, when the drive motor 50 is driven, e.g., in the forward rotational direction, a cam plate 48 is rotated in the direction indicated by arrow I in FIG. 9 through a connection gear mechanism 51 to rotate the first rotational lever 37 in the direction opposite to direction indicated by arrow G in FIG. 9 against biasing force of the extension spring 44. The second rotational lever 39 moves the cartridge engagement member 40 of the front end side in the direction opposite to the direction indicated by arrow H in FIG. 9 toward the internal of the unit body 22 where the cartridge engagement member 40 of the front side has been moved toward the cartridge insertion/withdrawal hole 23 side. When the second rotational lever 39 is moved in the direction opposite to the direction indicated by arrow H in FIG. 9, the cartridge engagement member 40 supported by the second rotational lever 39 is moved in the same direction. Thus, the first disc cartridge 1 in which the engagement recessed portion 20 has been engaged with this cartridge engagement member 40 is drawn into the external of the unit body 22.

Meanwhile, the cartridge holding plate 24 is vertically movably supported within the range between a first position at which insertion/withdrawal of the first disc cartridge 1 can be made and a second position lower than the first position at which recording and/or reproduction of information signals are carried out with respect to the optical disc 2 accommodated within the first disc cartridge 1. The cartridge holding plate 24 is adapted so that vertical movement is controlled by the cartridge drawing mechanism 35, and when the first disc cartridge 1 held by this cartridge holding plate 24 is caused to be drawn into the drawing position of the internal of the unit body 22, it is fallen to the second position to move the first disc cartridge 1 to the second position.

Moreover, the cartridge holding plate 24 is adapted so that when it is in the state where it has fallen on the second position, drive motor 50 constituting the cartridge drawing mechanism 35 is driven in reverse direction, and is elevated in a first position direction by rotation of the cam plate 48. When the drive motor 50 is further driven in reverse direction from this time point, and the cam plate 48 is rotated in the direction indicated by arrow I in FIG. 10, the first rotational lever 37 undergoes biasing force of the extension spring 44 so that it is rotated it in the direction indicated by arrow G in FIG. 9, and the second rotational lever 39 moves the cartridge engagement member 40 of the front end side toward the cartridge insertion/withdrawal hole 23 side to project the first disc cartridge 1 engaged with this cartridge engagement member 40 toward the external of the unit body 22 through the cartridge insertion/withdrawal hole 23.

The above-described disc recording and/or reproducing apparatus 21 in which the first disc cartridge 1 is used is adapted so that, at the lower surface side of the cartridge holding plate 24, there are disposed a disc rotational operation mechanism 55 and an optical pick-up unit 56 which constitute the recording and/or reproducing unit for carrying out recording and/or reproduction of information signals with respect to the optical disc 2 accommodated within the first disc cartridge 1 held by the cartridge holding plate 24. The disc rotational operation mechanism 55 and the optical pick-up unit 56 are attached through a base 57 disposed within the unit body 22, and are faced toward the upper side of the cartridge holding plate 24 through an opening portion 58 provided at the cartridge holding plate 24.

The operation for loading the first disc cartridge 1 with respect to the disc recording and/or reproducing apparatus 21 constituted as described above will now be described.

In order to carry out loading of the first disc cartridge 1, the cartridge holding plate 24 is placed at a first position which is position of the upper side spaced or away from the disc rotational operation mechanism 55 and the optical pick-up unit 56. Further, the first disc cartridge 1 is inserted into the unit body 22 through the cartridge insertion/withdrawal hole 23 with the side where shutter 11 is attached being as insertion end. The first disc cartridge 1 inserted into the unit body 22 is mounted on the cartridge holding plate 24 in the state where both sides perpendicular to the insertion end side are held by cartridge holding portions 25, 26. At this time, opening/closing pin 30 provided at the front end of the rotational arm 29 is opposed to one opening/closing engagement portion 18 provided at the shutter 11. Further, when the first disc cartridge 1 is inserted into the internal of the unit body 22, the opening/closing pin 30 is engaged with one opening/closing pin engagement portion 18. When the opening/closing pin 30 further inserts first disc cartridge 1 toward the internal of the unit body 22 from the state where the opening/closing pin 30 is engaged with the opening/closing pin engagement portion 18, the rotational arm 29 is rotated in the direction opposite to the direction indicated by arrow E in FIG. 10 against biasing force of the torsion coil spring 32. Followed by rotation of this rotational arm 29, the shutter 11 is moved in a direction to open the opening portion 7 for recording and/or reproduction provided at the cartridge body 3 to open this opening portion 7.

Further, when the first disc cartridge 1 is slightly inserted into the internal of the unit body 22 after the opening/closing pin 30 is engaged with the opening/closing pin engagement portion 18, the cartridge engagement member 40 of the cartridge drawing mechanism 35 is engaged with engagement recessed portion 20 of the first disc cartridge 1. Thus, insertion operation with respect to the cartridge holding plate 24 of the first disc cartridge 1 is completed.

When it is detected by detector means (not shown) that the first disc cartridge 1 is inserted up to the position where the cartridge engagement member 40 is engaged with the engagement recessed portion 20 of the first disc cartridge 1, the drive motor 50 begins driving in a forward rotational direction. As a result, the cam plate 48 is rotated in the direction indicated by arrow I in FIG. 9 through the connection gear mechanism 51 to rotate the first rotational lever 37 in the direction opposite to the direction indicated by arrow G in FIG. 10 against biasing force of the extension spring 44 to move the second rotational lever 39 in the direction opposite to the direction indicated by arrow H in FIG. 10. Further, the first disc cartridge in which engagement pawl 43 of the cartridge engagement member 40 supported by the second rotational lever 39 is engaged with the engagement recessed portion 20 is drawn to the drawing position of the internal of the unit body 2 at which center hole 2*a* of the optical disc 2 accommodated within the disc cartridge 1 is opposite to disc table 55*a* of the disc rotational operation mechanism 55.

At this time, the shutter 11 is moved to the position at which the opening portion 7 for recording and/or reproduction is completely released by the rotational arm 29 rotated followed by insertion of the first disc cartridge 1.

Figure 11:
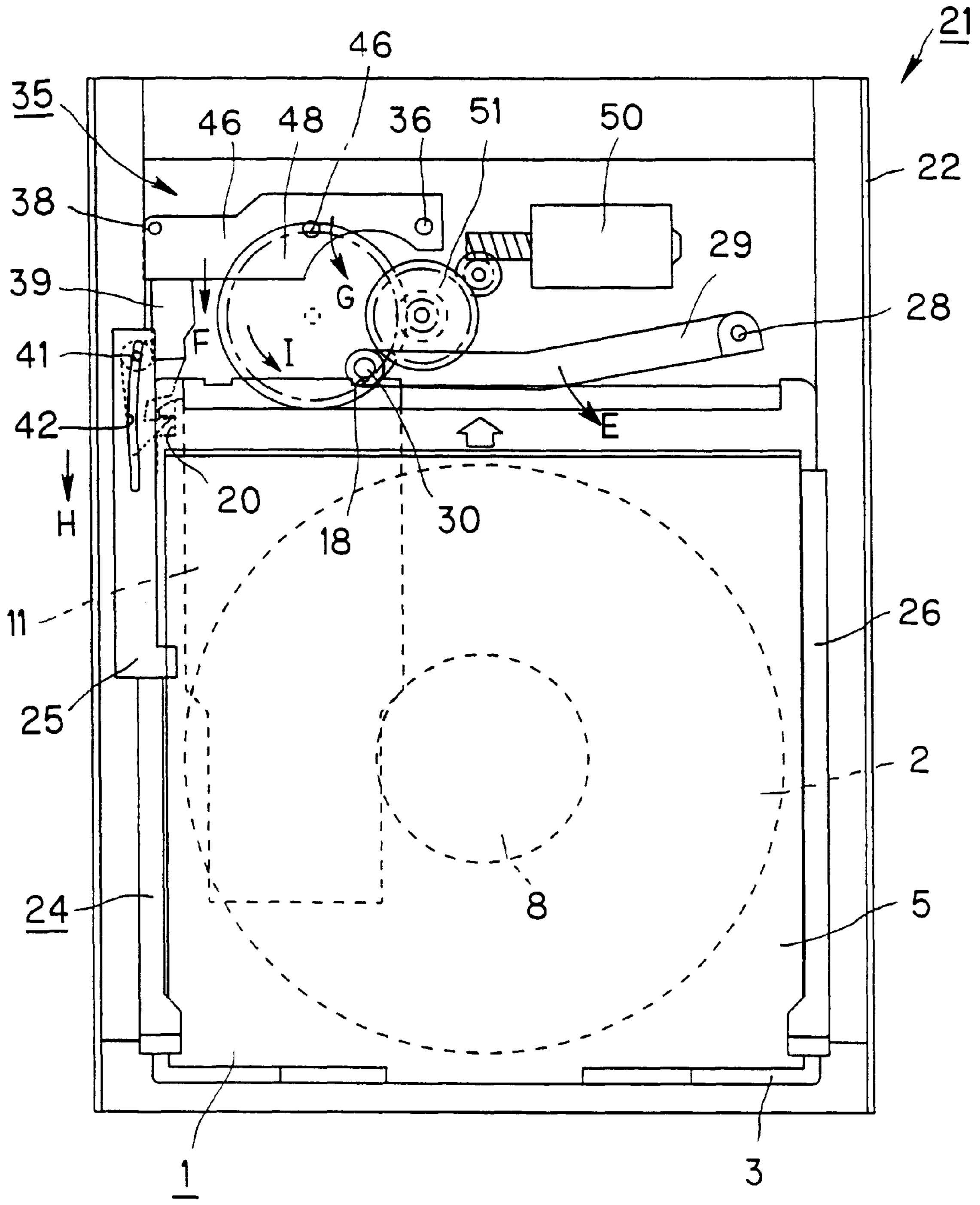
FIG. 11 is a plan view showing the state where first disc cartridge is caused to undergo loading with respect to the disc recording and/or reproducing apparatus.

When the drive motor 50 is further driven in a forward rotational direction from this time point, the cam plate 48 is rotated in the direction indicated by arrow I in FIG. 11, and the cartridge holding plate 24 is moved toward the second position side where the cartridge holding plate 24 has fallen on the side of the disc rotational operation mechanism 55 and the optical pick-up unit 56. When the cartridge holding plate 24 is fallen to the second position side, the optical disc 1 accommodated within the first disc cartridge 1 is mounted on the disc table 55*a* of the disc rotational operation mechanism 55, and is clamped by this disc table 55*a* and the clamping member 8. Thus, there results the state where the optical disc 2 is ratable in one body with the disc table 55*a*. At this time point, the disc rotational operation mechanism 55 starts rotational drive. Thus, the optical pick-up unit 56 is moved in the radial direction of the optical disc 2. As a result, the signal recording surface of the optical disc 2 is scanned by light beams emitted from the optical pick-up unit 56. Thus, recording and/or reproduction of information signals are carried out.

Figure 10:
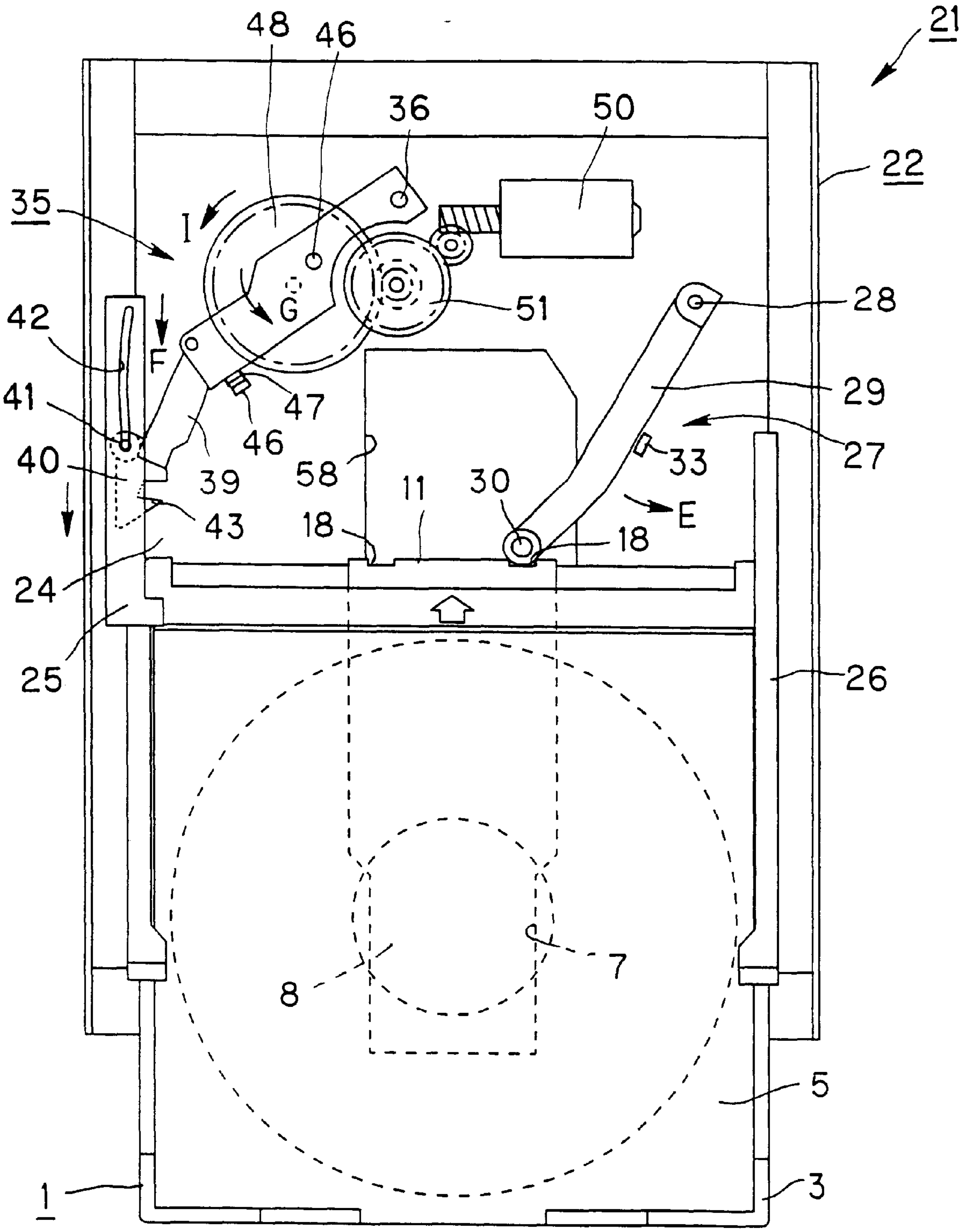
FIG. 10 is a plan view showing the state where first disc cartridge is inserted into the disc recording and/or reproducing apparatus.

When recording and/or reproducing operation of information signals with respect to the optical disc 2 are completed and eject button (not shown) provided at the unit body 22 is operated, the drive motor 50 is driven in a reverse rotational direction so that the cam plate 48 is rotated. Thus, the cartridge holding plate 24 is elevated in a first position direction away from the disc rotational operation mechanism 55 and the optical pick-up unit 56. Followed by upper movement of this cartridge holding plate 24, the first disc cartridge 1 is also elevated. When the drive motor 50 is further driven in a reverse rotational direction from this time point so that the cam plate 48 is rotated in the direction indicated by arrow I in FIG. 11, the first rotational lever 37 undergoes biasing force of the extension spring 44 so that it is rotated in the direction indicated by arrow G in FIG. 11. As a result, the second rotational lever 39 moves the cartridge engagement member 40 of the front end side toward the cartridge insertion/withdrawal hole 23 side to project, as shown in FIG. 10, the first disc cartridge 1 engaged with the cartridge engagement member 40 toward the external of the unit body 22 through the cartridge insertion/withdrawal hole 23. The first disc cartridge 1 is taken out from the unit body 22 by grasping and drawing the portion projected toward the external of the unit body 22 through the cartridge insertion/withdrawal hole 23.

The shutter 11 of the first disc cartridge 1 is rotated in the direction indicated by arrow E in FIG. 11 as the result of the fact that the rotational arm 29 undergoes biasing force of the torsion coil spring 32 followed by movement toward the cartridge insertion/withdrawal hole 23 side of the first disc cartridge 1, whereby the shutter 11 of the first disc cartridge 1 is rotated in the direction indicated by arrow E in FIG. 11 so that it undergoes biasing force of the extension spring provided within the cartridge body 3 and is thus moved to close the opening portion 7 for recording and/or reproduction.

A second disc cartridge 101 according to this invention is caused to undergo loading with compatibility with the first disc cartridge 1 with respect to the disc recording and/or reproducing unit 21 in which first disc cartridge 1 as described above is used. Accordingly, the second disc cartridge 101 according to this invention is formed so as to have the external shape caused to be substantially in correspondence with the above-described first disc cartridge 1.

The second disc cartridge 101 which is the disc cartridge according to this invention will now be described with reference to the attached drawings.

Figure 12:
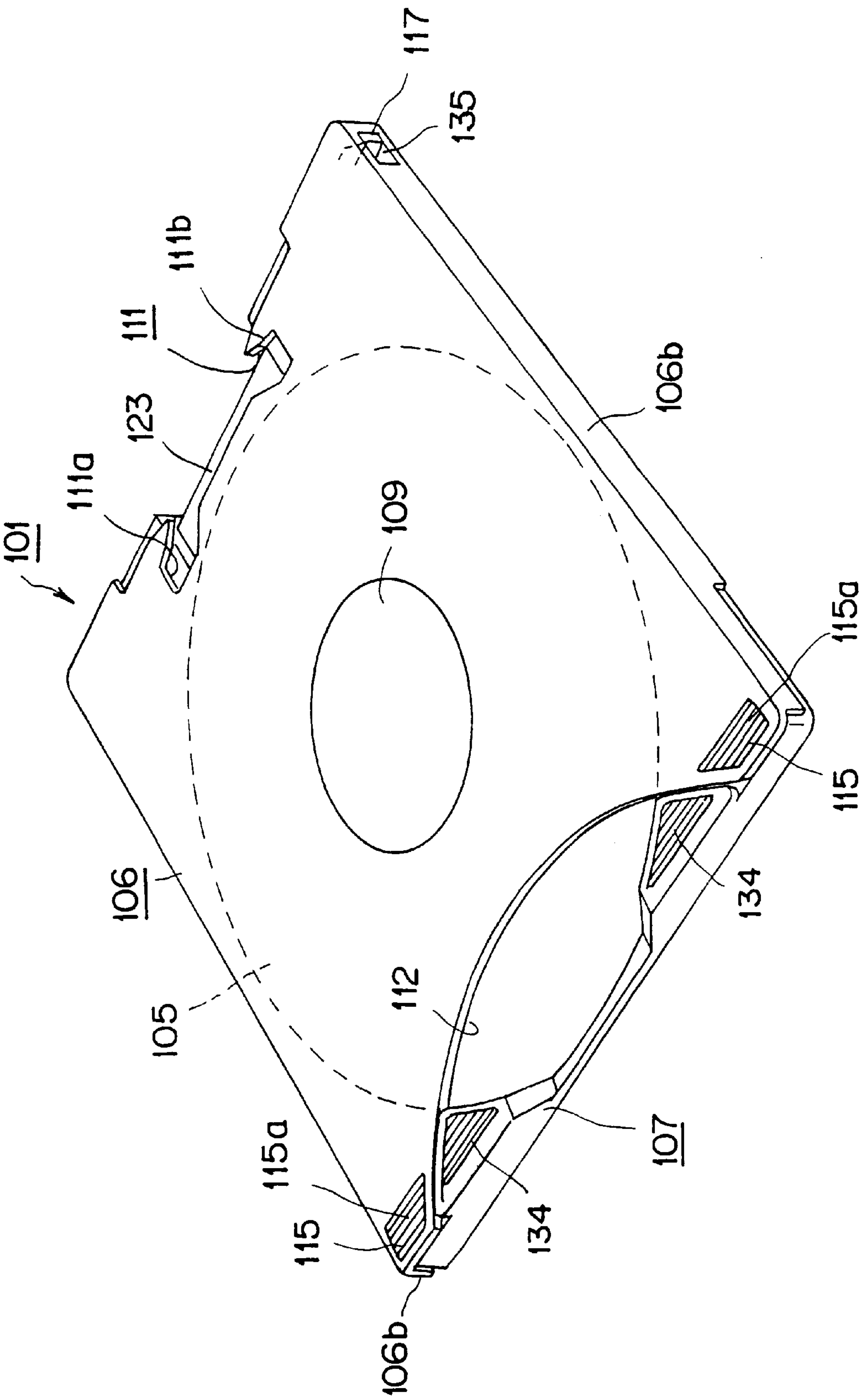
FIG. 12 is a perspective view of second disc cartridge according to this invention.
Figure 13:
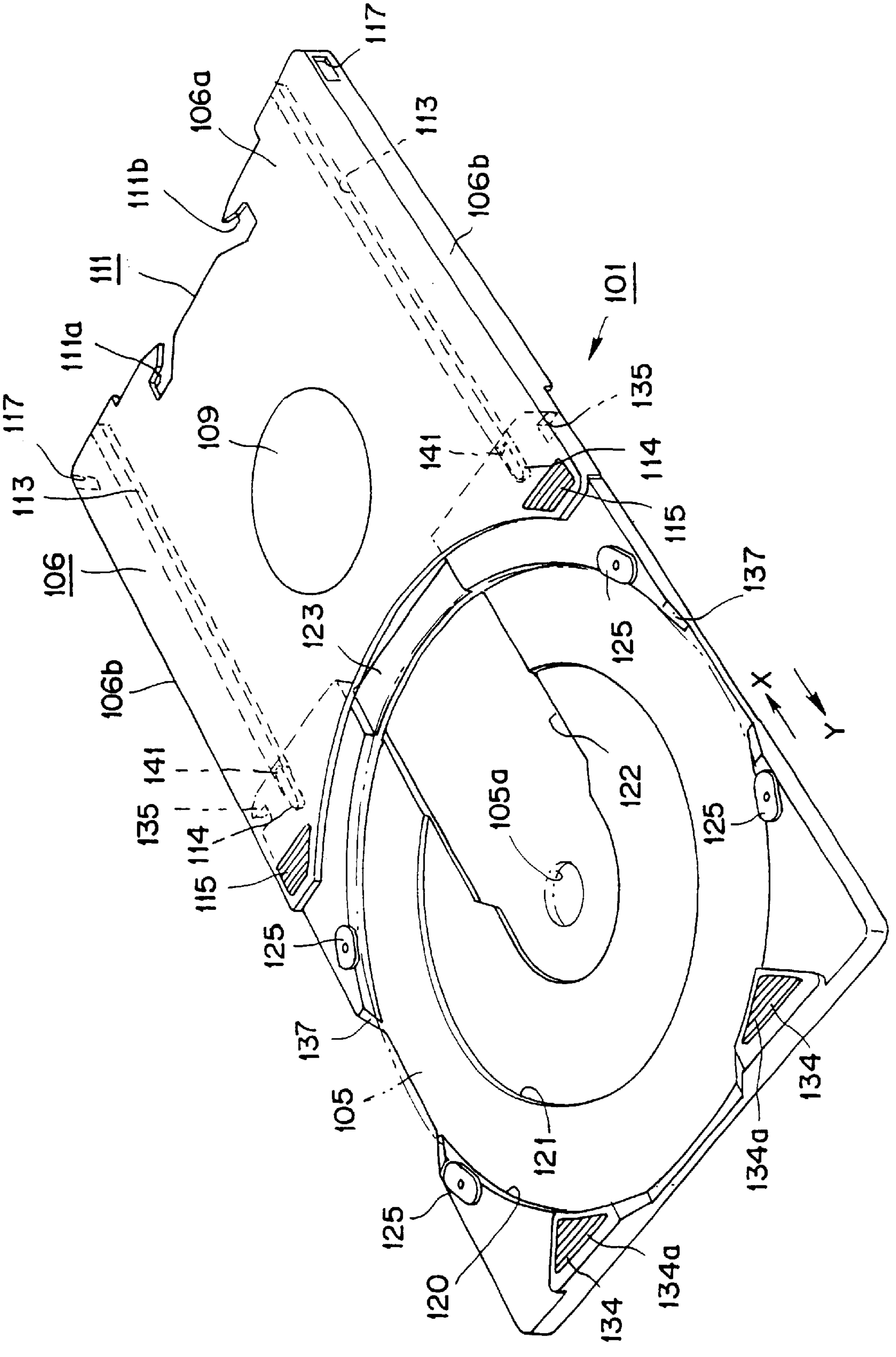
FIG. 13 is a plan view showing the state where tray is drawn out from holder.

As shown in FIGS. 12 and 13, this second disc cartridge 101 comprises a holder 106 inserted and held with respect to the disc recording and/or reproducing apparatus 21 in which the previously described first disc cartridge 1 is caused to undergo loading, and a tray 107 on which optical disc 105 (hereinafter referred to as disc 105) movably disposed with respect to this holder 106 is mounted.

Figure 14:
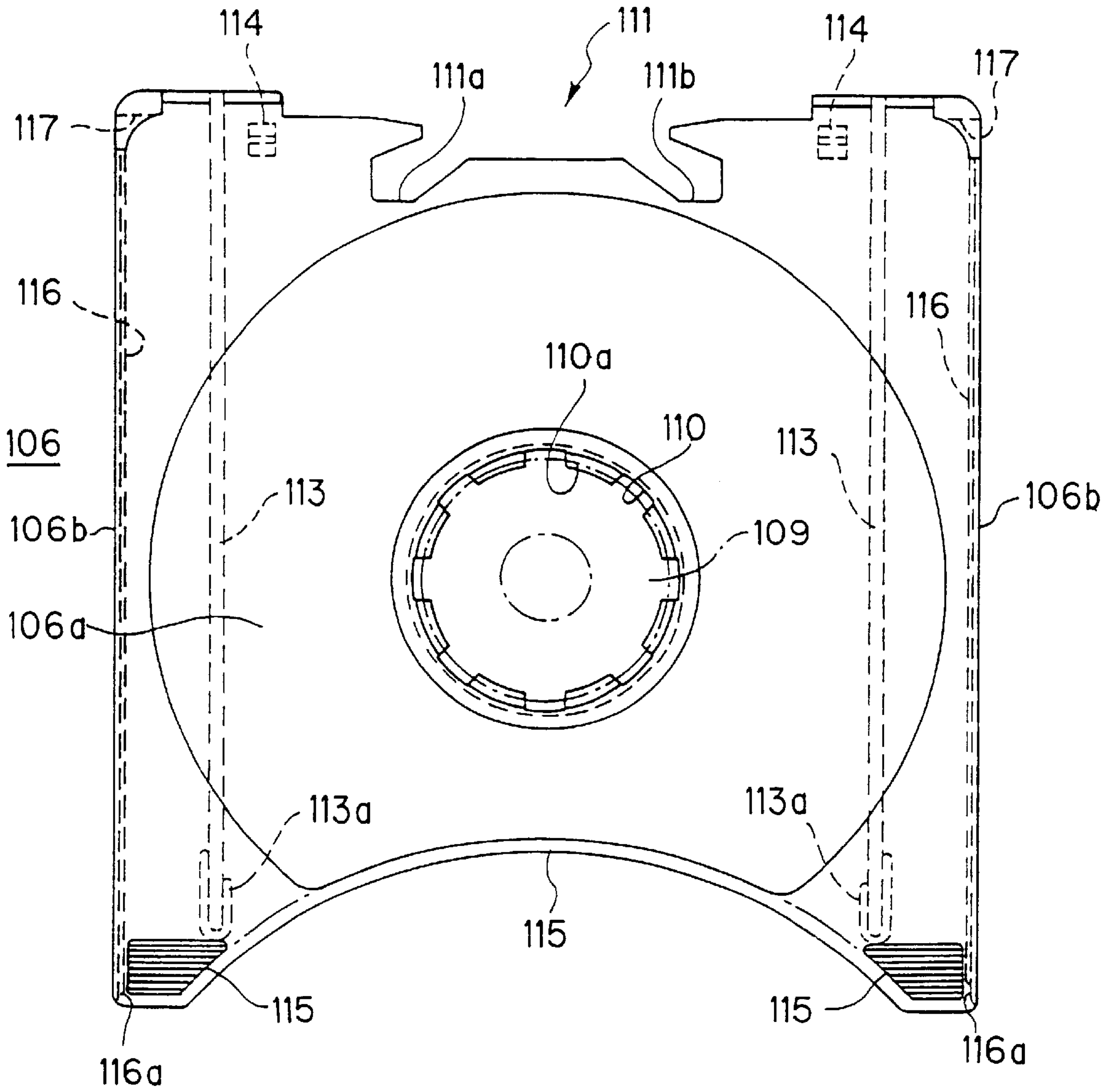
FIG. 14 is a plan view of holder constituting the second disc cartridge.
Figure 15:
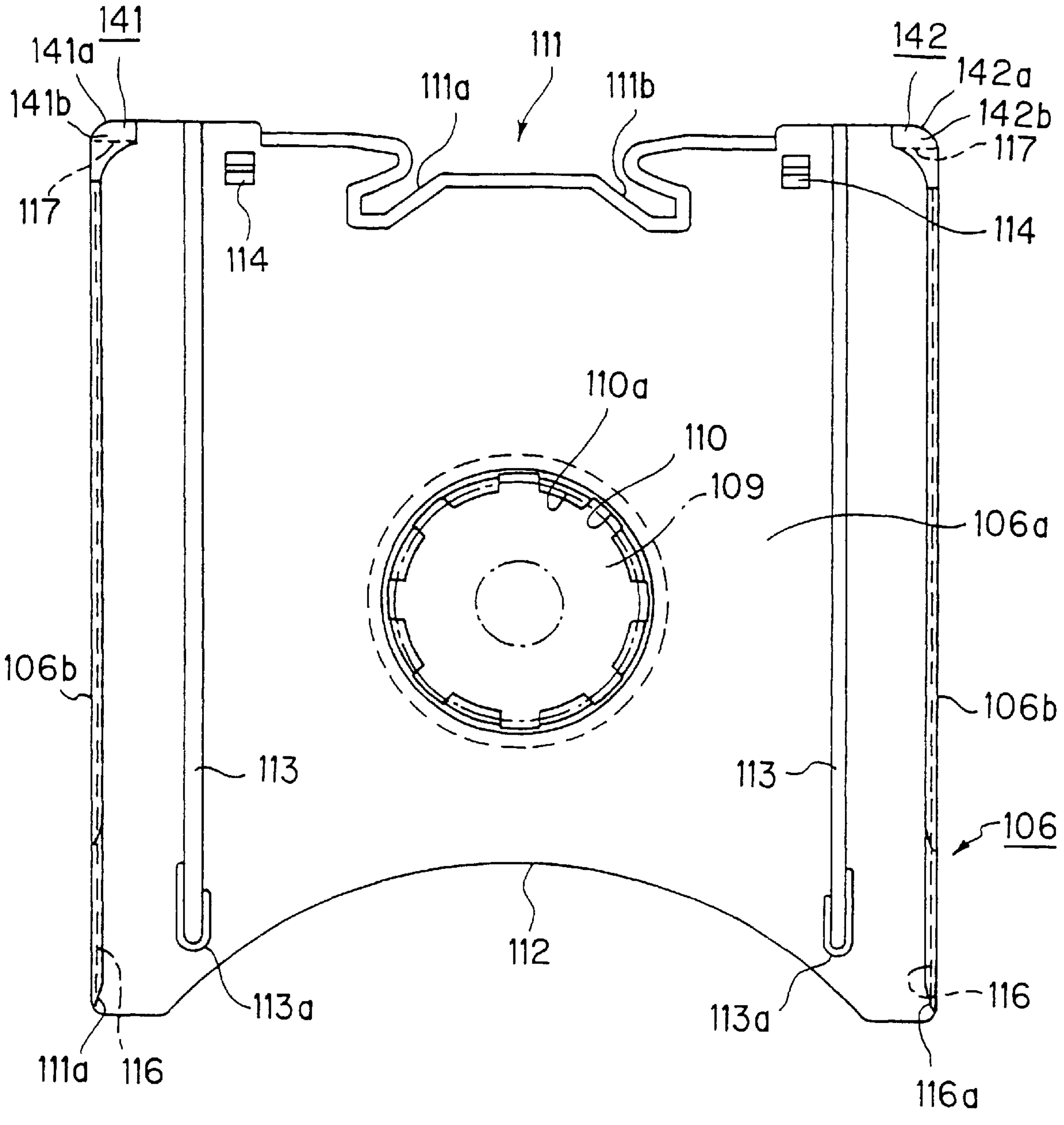
FIG. 15 is a bottom view of the holder.

As shown in FIGS. 14 and 15, the holder 106 is formed by using synthetic resin, wherein side walls 106*b*, 106*b* are respectively integrally formed on both sides opposite to each other in parallel to the insertion/withdrawal direction with respect to the disc recording and/or reproducing unit 21 of the principal surface portion 106*a* which is substantially rectangular.

In this holder 106, at the central portion of the principal surface portion 106*a,* there is provided an opening portion 110 which is formed circular for attachment of clamping member. Further, plural supporting pawls 110*a* are provided in a projected manner (hereinafter simply referred to as projected as occasion may demand) toward the internal side of the opening portion 110 at the internal surface side of the holder 106 and in the state positioned at the outer periphery of the opening portion 110, and there is rotatably supported a clamping member 109 for clamping the peripheral edge portion of the center hole 105*a* of the disc 105 in cooperation with the disc table 55*a* of the disc rotational operation mechanism 55 by these supporting pawls 110*a*.

Moreover, at the principal surface portion 106*a* of the holder 106, at the insertion end into the disc recording/reproducing apparatus 21 of the second disc cartridge 101, there is cut an engagement portion 111 with which the opening/closing pin 29 provided at the rotational arm 29 constituting the shutter opening/closing mechanism 27 provided at the disc recording and/or reproducing apparatus 21 is engaged. As shown in FIGS. 14 and 15, this engagement portion 111 comprises a first engagement groove 111*a* and a second engagement groove 111*b* separately cut so as to take recess shape from the central portion toward respective side walls 106*b*, 106*b* symmetrically with respect to the center line in parallel to insertion/withdrawal direction with respect to the disc recording and/or reproducing unit 21.

Further, at one end side opposite to the insertion end side into the disc recording and/or reproducing unit 21 of the principal surface portion 106*a* of the holder 106, there is formed a drawing cut portion 112 cut so as to take circular arc shape is formed. Thus, improvement in the operability for carrying out drawing operation of the tray 107 inserted into the holder 106 is made by this drawing cut portion 112.

Moreover, at the internal surface side of the principal surface portion 106*a* of the holder 106, there are formed a pair of guide grooves 113, 113 which take recess shape in cross section along respective side walls 106*b*, 106*b* in parallel to the insertion/withdrawal direction with respect to the disc recording and/or reproducing unit 21. These guide grooves 113, 113 open insertion end side with respect to the disc recording and/or reproducing apparatus 21. Respective guide grooves 113, 113 are adapted so that when the second disc cartridge 10 is inserted into the disc recording and/or reproducing apparatus 21, striking pieces 113*a*, 113*a* which take substantially U-shape are integrally projected at one end side positioned at the outer side of the unit body 22. These striking pieces 113*a*, 113*a* close one end sides of respective guide grooves 113, 113 to prevent slipping off from the holder 106 when tray 107 movably supported by the holder 106 is drawn out from the holder 106.

Moreover, at the principal surface portion 106*a* of the holder 106, as shown in FIGS. 14 and 15, there are projected engagement projections 114, 114 engaged with the tray 107 in the state positioned at the insertion side into the disc recording and/or reproducing apparatus 21.

Further, on both sides of one end side of the principal surface portion 106*a* of the holder 106, i.e., on both sides of the drawing opening portion 112, as shown in FIGS. 12 and 14, there are provided grip portions 115, 115 overlapping with a portion of the tray 107 inserted into this holder 107 and gripped together with the tray 107. At the outer surface side of these gripping portions 115, 115, as shown in FIG. 14, plural uneven portions 115*a*, 115*a* are provided for the purpose of putting finger. These grip portions 115, 115 serve to provide improvement in operability in carrying out drawing operation of the tray 107 from the disc recording and/or reproducing apparatus 21 along with the holder 106.

Figure 16:
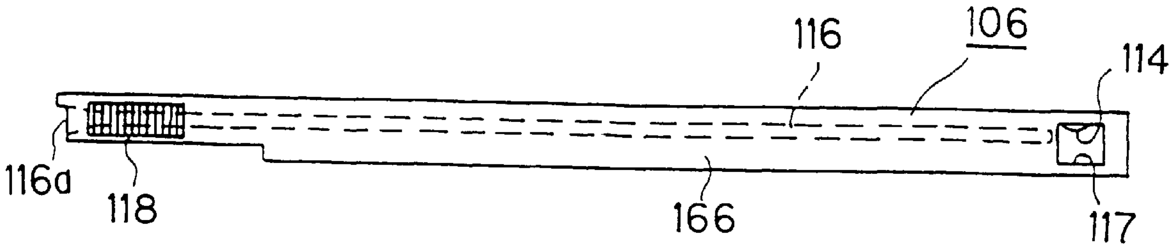
FIG. 16 is a side view of the holder.

Moreover, at internal surface sides opposite to each other of the respective side walls 106*b*, 106*b* of the holder 106, as shown in FIG. 16, there are formed guide grooves 116, 116 for movably supporting the tray 7 are formed along the length direction. These guide grooves 116, 116 open one end portions 116*a*, 116*a* toward one end side of the principal surface portion 106*a*.

Further, at respective side walls 106*b*, 106*b* of the holder 106, there are provided, as shown in FIG. 16, engagement holes 117 with which cartridge engagement member 40 of the cartridge drawing mechanism 35 provided at the disc recording and/or reproducing unit 21 side is engaged in the state positioned at the insertion end side of the principal surface portion 106*a*. These engagement holes 117 are formed so as to take substantially rectangle as shown in FIG. 16.

Furthermore, as shown in FIGS. 12 and 16, finger putting portions 118, 118 consisting of plural uneven portions are formed in the state positioned at the side where grip portions 115, 115 of the outside surface side of respective side walls 106*b*, 106*b* of the holder 106 are formed. These finger putting portions 118, 118 serve to securely grip the holder 106 when the tray 107 is caused to undergo drawing operation from the holder 106, thus making it possible to securely and independently draw out the tray 107 from the holder 6.

At the insertion end side into the disc recording and/or reproducing apparatus 21 of the holder 106, there are provided holding portions 141, 142 for limiting movement in the insertion end direction of the tray 107 movably held by this holder 106 to prevent slipping off from the holder 106. As shown in FIG. 15, these holding portions 141, 142 are composed of limiting pieces 141*a*, 142*a* formed so as to hang down toward the insertion end side of the tray 107 and supporting pieces 141*b*, 142*b* extended toward the internal surface side of the holder 106, and is formed so as to take channel shape in cross section and is formed so that a portion of both sides of the insertion end side of the tray 107 is engaged.

Figure 17:
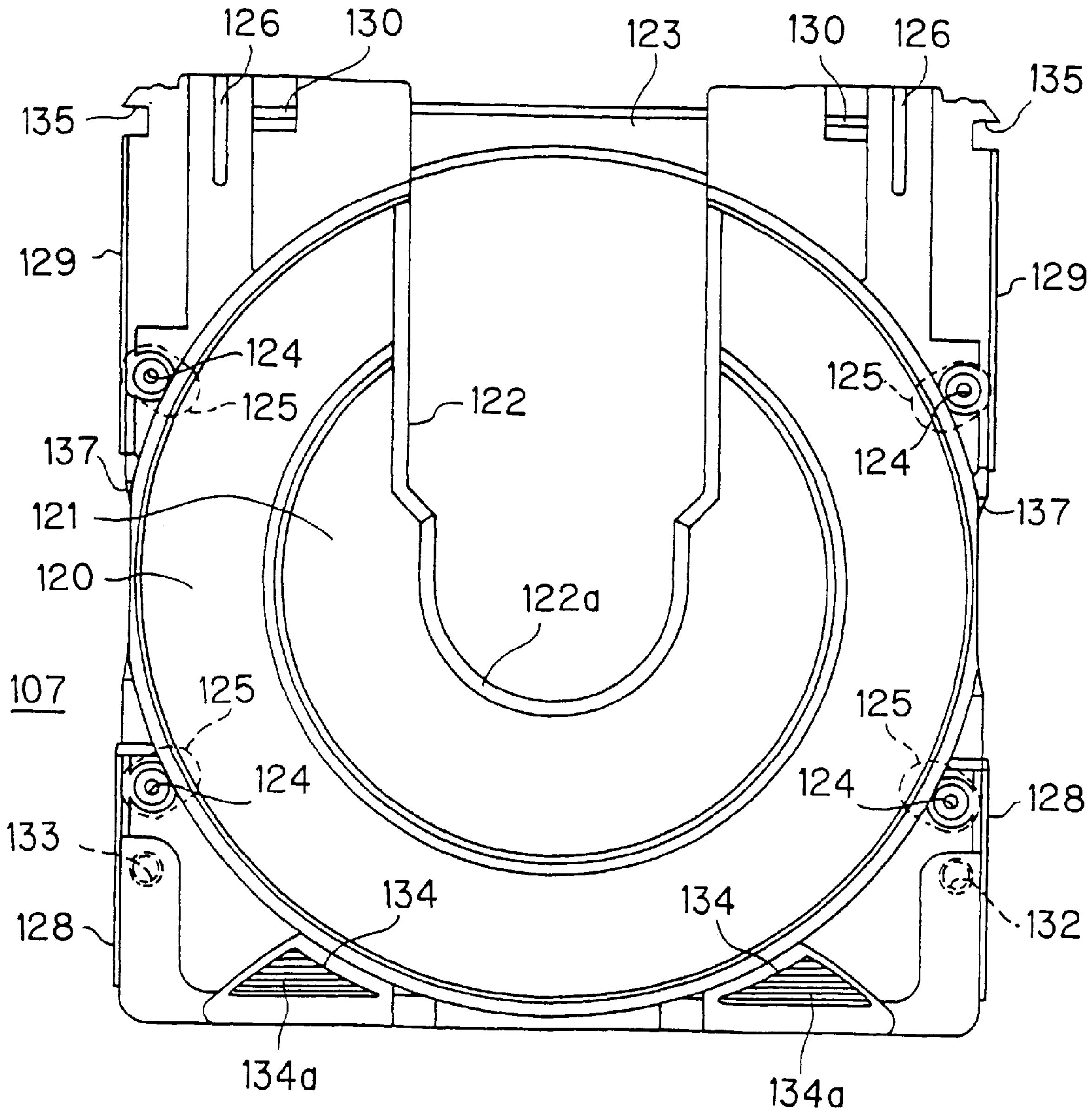
FIG. 17 is a plan view of tray constituting the second disc cartridge according to this invention.
Figure 18:
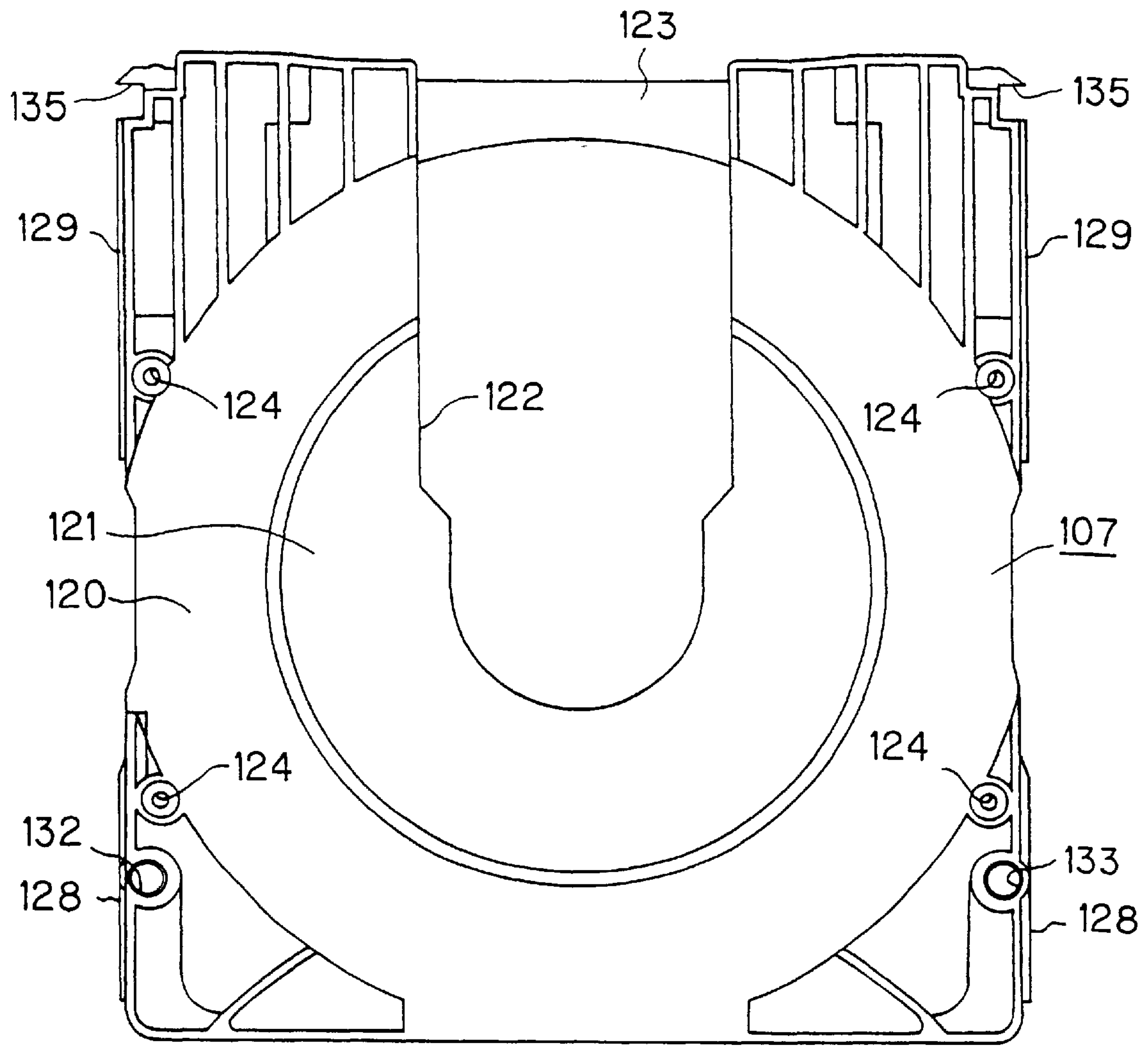
FIG. 18 is a bottom view of the tray.

On the other hand, as shown in FIGS. 17 and 18, the tray 107 movably held by the holder 106 is formed so as to take substantially rectangular shape by molding synthetic resin. At one surface side, there are concentrically formed a first disc mounting portion 120 which takes circular recess shape on which there is mounted first disc 105 having diameter similarly caused to be in correspondence with the optical disc 2 accommodated within the previously described first disc cartridge 1, and a second disc mounting portion 121 which takes circular recess shape on which the disc having diameter caused to be 80 mm is mounted. In this example, the second disc mounting portion 121 of small diameter is of a structure in which the bottom portion of the first disc mounting portion 120 is formed so as to take recess shape.

Moreover, at the tray 7, there is provided an opening portion 122 for recording and/or reproduction adapted so that when the second disc cartridge 101 is caused to undergo loading with respect to the disc recording and/or reproducing apparatus 21, the optical pick-up device 56 and the disc table 55*a* of the disc rotational operation mechanism 55 disposed at the disc recording and/or reproducing unit 21 are faced to first and second disc mounting portions 120, 121. As shown in FIG. 17, this recording and/or reproducing opening portion 122 is formed from the central portion toward the insertion end side into the disc recording and/or reproducing apparatus 21 at the first and second disc mounting portions 120, 121 in the state positioned at the central portion in left and right directions of the tray 107. At the opening edge of this opening portion 122, a supporting projection 122*a* which is substantially U-shaped for supporting the central portion of the disc 105 mounted on the first or second disc mounting portion 120 or 121 is integrally formed in a projected manner as shown in FIG. 17.

Further, at the insertion end side into the disc recording and/or reproducing apparatus 21 of the tray 107, there are provided, as shown in FIGS. 17 and 18, an engagement releasing portion 123 for releasing engagement of the opening/closing pin 30 of the rotational arm 29 provided at the disc recording and/or reproducing apparatus 21 side engaged with the engagement portion 111 of the holder 106. This engagement releasing portion 123 is provided so as to close the insertion end side into the disc recording and/or reproducing unit 21 of the recording and/or reproduction opening portion 122, and is adapted so that when the tray 107 is inserted with respect to the holder 106 in such a manner that the tray 107 overlaps with the holder 106, the tray 107 is caused to overlap with the engagement portion 111 to thereby press opening/closing pin 30 engaged with the engagement portion 111 to rotate the rotational arm 29 against biasing force of the torsion coil spring to release engagement with respect to the engagement portion 111 of the opening/closing pin 30.

Further, at the tray 7, there are provided plural disc supporting members 125 for supporting the outer circumferential edge side of the disc 105 mounted on the first mounting portion 120 in the state positioned at the outer periphery of the first disc mounting portion 120 and for preventing slipping off from the first disc mounting portion 120 of the disc 105. As shown in FIG. 17, these supporting members 125 are respectively rotatably attached through attachment holes 124 bored at the outer periphery of the first disc mounting portion 120 so that the disc supporting portion of the front end side is subjected to rising and setting within the first disc mounting portion 120. These disc supporting members 125 are adapted so that even in the case where the tray 107 is vertically provided, slipping off of the disc mounted on the second disc mounting portion 120 can be prevented.

At one surface side of the tray 107, as shown in FIG. 17, there are projected engagement projections 126, 126 engaged with guide grooves 113, 113 provided at the holder 106 side when tray 107 is inserted into the holder 106. These engagement projections 126, 126 are provided in the state positioned on both sides of the insertion end side into the disc recording and/or reproducing apparatus 21 of the tray 107.

Moreover, there are provided engagement recessed portions 130, 130 relatively engaged with engagement projections 114, 114 provided at the holder 106 when the tray 107 is caused to overlap with the holder 106 as shown in FIG. 12 in the state positioned at one surface side opposite to the holder 106 of the tray 107. These engagement recessed portions 130, 130 are provided in the state positioned on both sides of the insertion end side into the disc recording and/or reproducing unit 21 of the tray 107.

The tray 107 is adapted so that when this tray is caused to overlap with the holder 106, engagement projections 114, 114 and engagement recessed portions 130, 130 are relatively engaged with each other, whereby overlapping position with respect to the holder 106 is held, thus making it possible to securely hold the disc 105 mounted on the first and second mounting portions 120, 121.

In this example, at the engagement projections 114, 114 and the engagement recessed portions 130, 130, there are formed inclined surfaces on one side so as to have ability to easily carry out engagement/withdrawal to each other.

Figure 19:
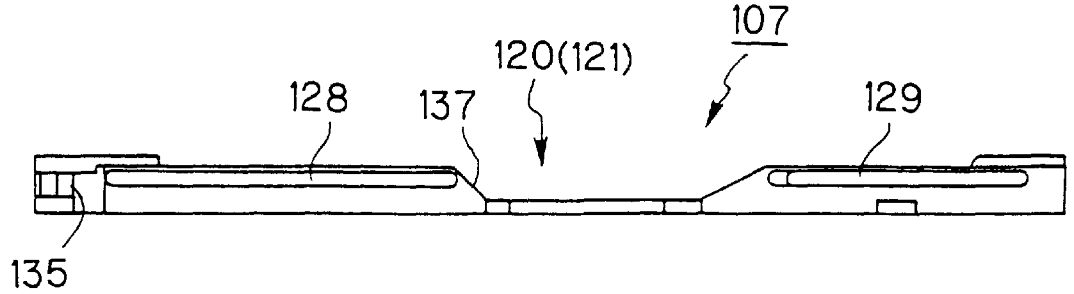
FIG. 19 is a side view of the tray.
Figure 20:
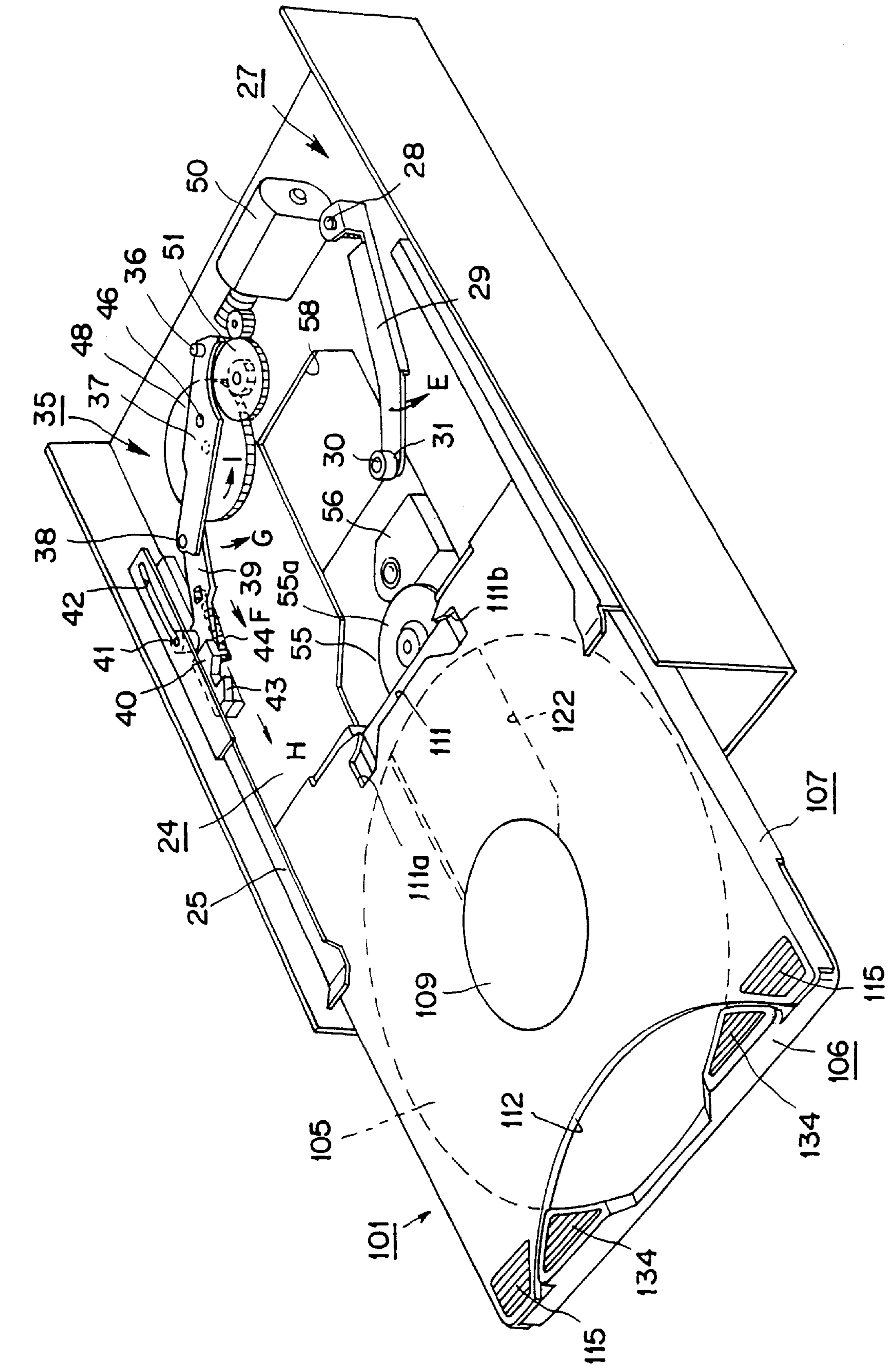
FIG. 20 is a perspective view showing the state where second disc cartridge according to this invention is inserted into the disc recording and/or reproducing apparatus.

At both sides in parallel to the insertion direction with respect to the holder 106 of the tray 107, there are provided, as shown in FIGS. 18 and 19, respective pairs of projection portions 128, 128 and 129, 129 serving as the guide portion engaged with the guide grooves 116, 116 provided at both sides of the holder 106 when this tray 107 is inserted into the holder 106. These projection portions 128, 128 and 129, 129 are provided, as shown in FIG. 19, in the state split into the insertion end side and one end side with respect to the disc recording and/or reproducing unit 21 of the tray 107.

Further, at both sides of one end side opposite to the insertion end side into the disc recording and/or reproducing unit 21 of the tray 107, there are provided, as shown in FIG. 17, grip portions 134, 134 which grip only the tray 107 to independently permit drawing operation with respect to the holder 106. As shown in FIG. 12, these grip portions 134, 134 are provided at the position facing to the external through drawing cut portion 112 provided at one end side of the tray 107 when the tray 107 is inserted into the holder 106 so that it is caused to overlap with this tray 106. At one surface side of the gripping portions 134, 134, there is formed an uneven portion 134*a* serving as slide stopper when finger is put.

Furthermore, at both sides of the insertion end into the disc recording and/or reproducing apparatus 21 of the tray 107, there are provided engagement recessed portions 135, 135 with which there is engaged cartridge engagement member 40 of the cartridge drawing mechanism 35 provided at the disc recording and/or reproducing unit 21 side when the tray is caused to overlap with the holder 106 and is inserted into the disc recording and/or reproducing apparatus in a manner integral therewith as shown in FIGS. 17 and 18. These engagement recessed portions 135, 135 are adapted as shown in FIG. 12 so that when the first disc mounting portion 120 is caused to overlap with the tray 106 so that it is covered by the holder 106, they are provided at the position communicating with the engagement holes 117, 117 provided at the holder 106 side. By providing the engagement recessed portions 135, 135 in this way, the holder 106 and the tray 107 are simultaneously engaged with the cartridge engagement member 40. By providing the engagement holes 117, 117 and the engagement recessed portions 135, 135 in this way, the holder 106 and the tray 107 are caused to simultaneously undergo drawing operation by the cartridge drawing mechanism 35 of the disc recording and/or reproducing unit 21. Thus, simplification of the cartridge drawing mechanism 35 can be realized, and the tray 107 on which the disc 105 is mounted is permitted to securely undergo loading with respect to the disc recording and/or reproducing unit 21.

Further, at the other surface side of the tray 107, there are provided, as shown in FIG. 18, a circular first positioning hole 132 and an elliptical second positioning hole 133 with which positioning pins, not shown provided at the cartridge loading portion side are engaged when this second disc cartridge 101 is loaded with respect to the cartridge loading portion of the disc recording and/or reproducing unit 21.

These first and second positioning holes 132, 133 are provided in the state positioned on both sides of one end side of the tray 107.

Furthermore, at both sides opposite to each other of the tray 107, there are provided recessed portions 137, 137 for putting finger which permits finger to be put with respect to the outer circumferential edge of this disc 105 when disc 105 mounted on the first disc mounting portion 120 is taken out. These finger putting recessed portions 137, 137 are formed so as to have depth up to the bottom surface of the first disc mounting portion 120.

In this example, at the tray 107, although not shown, there may be provided an erroneous erasing prevention hole for preventing that information signals are erroneously recorded with respect to the disc 105 to thereby erase information signals recorded in advance.

The holder 106 and the tray 107 of the second disc cartridge 101 according to this invention constituted as described above are integrally assembled by inserting the tray 107 into the portion between side walls 106*b*, 106*b* of the holder 106. At this time, the tray 107 is inserted into this holder 106 in the state where one surface side where the first and second disc mounting portions 120, 121 are provided is opposed to the holder 106. Moreover, the tray 107 engages engagement projections 126, 126 provided at one surface side with the respective guide groves 113, 113 of the holder 106 to further engage projection portions 128, 128 and 129, 129 provided at both sides opposite to each other with guide grooves 116, 116 formed at the internal surface of the side walls 106*b*, 106*b* of the holder 106, whereby they are held by the holder 106 so that it can be moved in the direction indicated by arrow X and in the direction indicated by arrow Y in FIG. 13 while being guided by these guide grooves 113, 113 and guide grooves 116, 116.

The tray 107 held by the holder 106 is adapted so that the projecting portions 128, 128 and 129, 129 are moved in the direction indicated by arrow X in FIG. 12 while being guided by the guide grooves 113, 113 and the guide grooves 116, 116 by thrusting one end side thereinto, and are caused to overlap with the holder 106 so that the first disc mounting portion 120 is covered by the holder 106 as shown in FIG. 12. At this time, engagement projections 114, 114 of the holder 106 side are engaged with engagement recessed portions 130, 130 of the tray 107 side. As a result, overlapping position with respect to the holder 106 of the tray 107 is held. Thus, the state where the first and second disc mounting portions 102, 121 are covered by the holder 107 is securely held. Further, a portion of both sides of the insertion end side of the tray 107 is engaged with holding portions 141, 142, whereby further insertion with respect to the holder 107 is limited. Thus, the tray 107 is securely held by the holder 107.

The tray 107 caused to overlap with the holder 106 is adapted so that when the holder 107 is fixed to grip either one grip portion 134 of one end side to draw out it in the direction indicated by arrow Y in FIG. 12, engagement of engagement projections 114, 114 with respect to the engagement recessed portions 130, 130 is caused to be out of position. Thus, further drawing operation in the direction indicated by arrow Y in FIG. 12 can be made. Further, when the tray 107 is further drawn and is drawn until the position at which the engagement projections 126, 126 are caused to collide against the strike pieces 113*a*, 113*a* so that movement is limited, the first and second disc mounting portions 120, 121 are opened. Thus, exchange of the disc 105 with respect to the first or second disc mounting portion 120 or 121 can be carried out.

By exchanging the disc 105 thereafter to insert the tray 107 into the holder 106 for a second time, the first and second disc mounting portions 120, 121 are covered by the holder 107, resulting in the state where the tray 107 and the holder 106 are integrated. Thus, there results second disc cartridge 101 of which size is caused to be substantially in correspondence with the first disc cartridge 1.

The operation for allowing the second disc cartridge 101 according to this invention to undergo loading with respect to the previously described disc recording and/or reproducing unit 21 adapted so that the first disc cartridge 1 is caused to undergo loading to exchange disc 105 mounted on the tray 107 in the state held by the disc recording and/or reproducing unit 21 will now be described.

In order to allow the second disc cartridge 101 to undergo loading with respect to the disc recording and/or reproducing unit 21, the tray 107 is inserted into the holder 106 to integrate the tray 107 and the holder 106 as shown in FIG. 12.

When the second disc cartridge 101 is caused to undergo loading, the disc recording and/or reproducing unit 21 places, similarly to the case where the previously described first disc cartridge 1 is caused to undergo loading, the cartridge holding plate 24 at a first position which is the position of the upper side spaced or away from the disc rotational operation mechanism 55 and the optical pick-up device 56.

Further, the second disc cartridge 101 is inserted into the unit body 22 through the cartridge insertion/withdrawal hole 23 from the insertion end side where engagement portion 111 with which opening/closing pin 30 is engaged is provided. The second disc cartridge 101 inserted into the unit body 22 is mounted on the cartridge holding plate 24 in the state where both sides perpendicular to the insertion end side are held by the cartridge holding portions 25, 26.

Further, when the second disc cartridge 101 is inserted into the internal of the unit body 22, it is caused to overlap with the holder 106. Thus, the opening/closing pin 30 is caused to be in contact with the engagement releasing portion 123 provided at the insertion end side of the tray 107 which allows the engagement portion 111 with which the opening/closing pin 30 is engaged to be in closed state. Further, there results the state where engagement with respect to the engagement portion 111 of the opening/closing pin 30 is limited.

Figure 21:
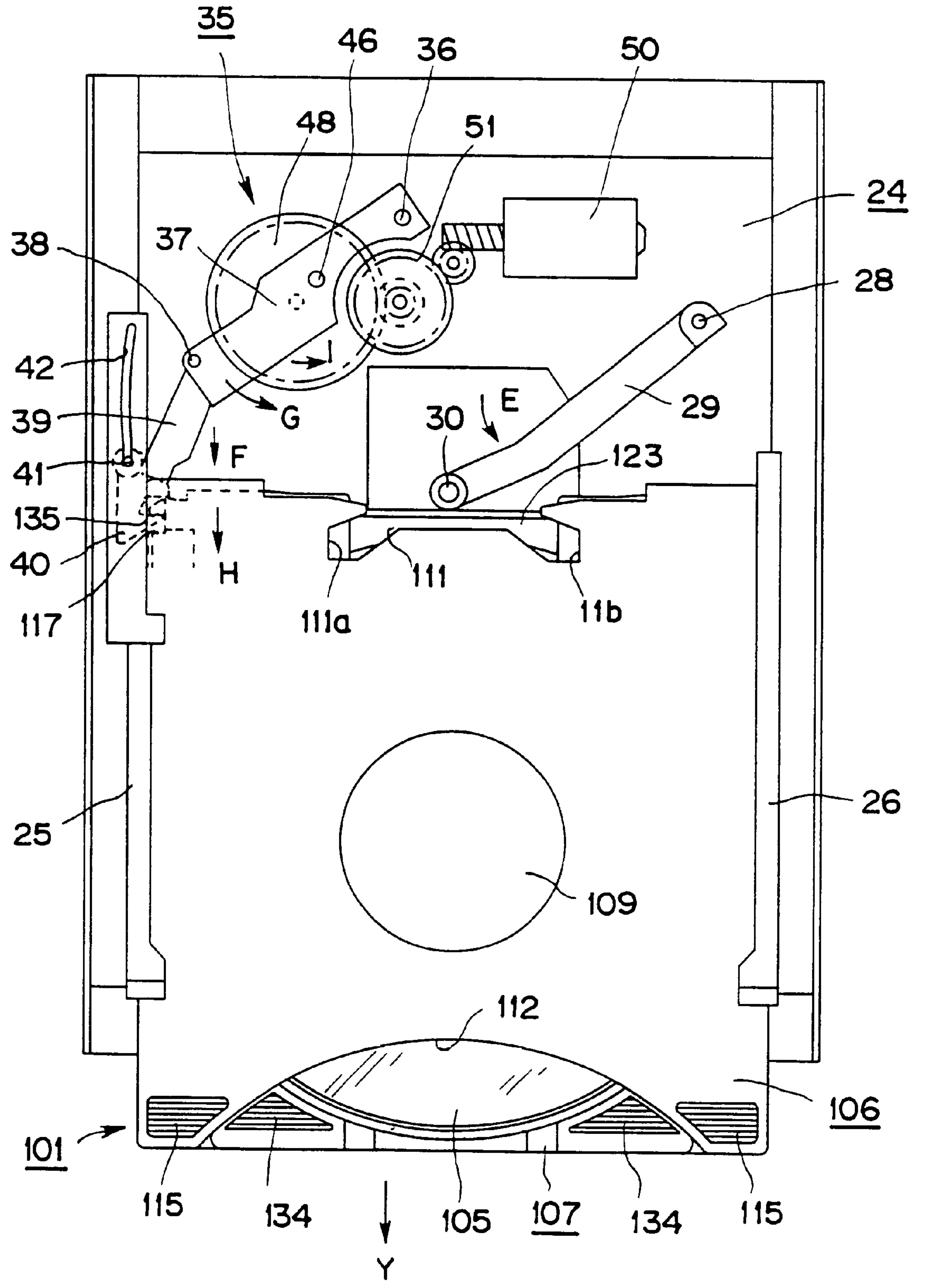
FIG. 21 is a plan view showing the state where second disc cartridge is held by cartridge drawing mechanism.

When after the opening/closing pin 30 is caused to be in contact with the engagement releasing portion 123, the second disc cartridge 101 is further slightly inserted into the internal of the unit body 22, cartridge engagement member 40 of the cartridge drawing mechanism 35 is engaged with the engagement hole 117 provided at one side of the holder 106 as shown in FIG. 21. At this time, since the tray 107 is caused to overlap with the holder 106, there results the state where it is opposite to the engagement recessed portion 135 of the engagement hole 117 of the holder 106 and is caused to communicate therewith. In view of the above, the cartridge engagement member 40 engaged with the engagement hole 117 of the holder 106 is simultaneously engaged with the engagement recessed portion 135, thus to integrally hold the holder 106 and the tray 107.

When the second disc cartridge 101 is inserted until the position at which the cartridge engagement member 40 is engaged with the holder 106, and the engagement hole 117 and the engagement recessed portion 135 of the tray 107, it is detected by detection means (not shown) that the second disc cartridge 101 has been inserted into the unit body 22. As a result, drive motor 50 constituting the cartridge drawing mechanism 35 starts driving in a forward rotational direction. Thus, cam plate 48 is rotated in the direction indicated by arrow I in FIG. 21 through the connection gear mechanism 51 to rotate the first rotational lever 37 in the direction opposite to the direction indicated by arrow G in FIG. 21 against biasing force of the extension spring 44 to move the second rotational lever 39 in the direction opposite to the direction indicated by arrow H in FIG. 21. Further, the second disc cartridge 101 in which engagement pawl 43 of the cartridge engagement member 40 supported by the second rotational lever 39 is engaged with the engagement hole 117 and the engagement recessed portion 135 is drawn until drawing position of the internal of the unit body 2 at which center hole 105*a* of the disc 105 accommodated within the disc cartridge 101 is opposite to the disc table 55*a* of the disc rotational operation mechanism 55 as shown in FIG. 22 while the both sides are guided by the cartridge holding portions 25, 26.

Figure 22:
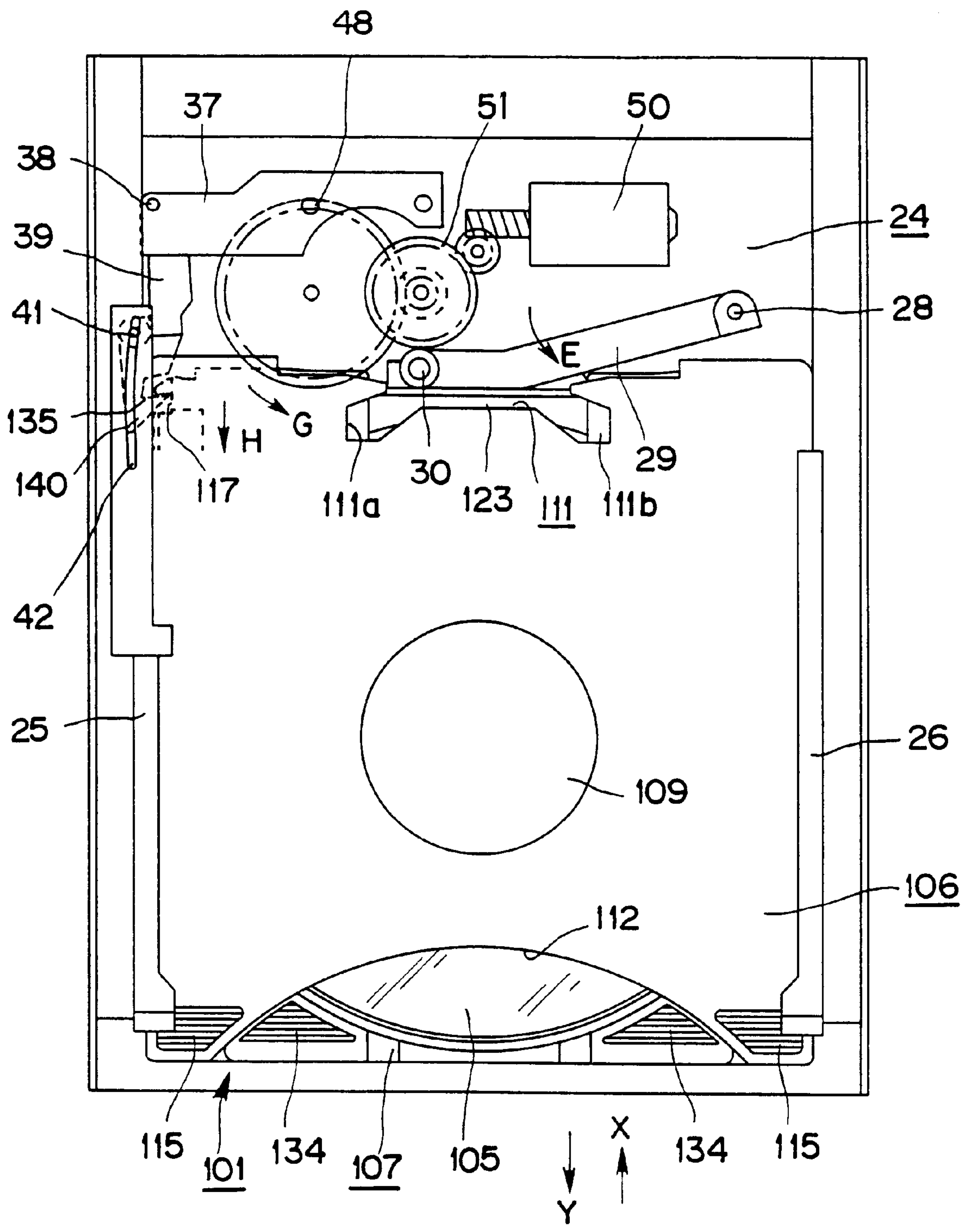
FIG. 22 is a plan view showing the state where second disc cartridge is loaded with respect to the disc recording and/or reproducing apparatus.

When the drive motor 50 is further driven in a forward rotational direction from this time point, the cam plate 48 is rotated in the direction indicated by arrow I in FIG. 22. As a result, the cartridge holding plate 24 is moved toward the second position side where the cartridge holding plate 24 has fallen to the side of the disc rotational operation mechanism 55 and the optical pick-up unit 56 side. When the cartridge holding plate 24 has fallen to the second position side, the disc 101 accommodated within the second disc cartridge 101 is mounted on the disc table 55*a* of the disc rotational operation mechanism 55, and is clamped by this disc table 55*a* and clamping member 109 provided at the holder 106. Thus, there results the state where the disc 101 can be rotated in one body with the disc table 55*a*. At this time point, the disc rotational operation mechanism 55 starts rotational drive. As a result, the optical pick-up unit 56 moves in the radial direction of the optical disc 2. Thus, the signal recording surface of the disc 105 is scanned by light beams emitted from the optical pick-up unit 56 so that recording and/or reproduction of information signals are carried out.

When recording and/or reproduction operation of information signals with respect to the optical disc 2 are completed and eject button (not shown) provided at the unit body 22 is operated, the drive motor 50 is driven in reverse rotational direction so that the cam plate 48 is rotated, whereby the cartridge holding plate 24 is elevated in a first position direction spaced or away from the disc rotational operation mechanism 55 and the optical pick-up unit 56. Followed by upper movement of this cartridge holding plate 24, the first disc cartridge 1 is also elevated. When the drive motor 50 is further driven in reverse rotational direction from this time point, and the cam plate 48 is rotated in the direction indicated by arrow I in FIG. 22, the first rotational lever 37 undergoes biasing force of the extension spring 44 so that it is rotated in the direction indicated by arrow G in FIG. 22. As a result, the second rotational lever 39 moves the cartridge engagement member 40 of the front end side toward the cartridge insertion/withdrawal hole 23 side to project the second disc cartridge 101 engaged with this cartridge engagement member 40 toward the external of the unit body 22 through the cartridge insertion/withdrawal hole 23 as shown in FIG. 21.

At this time, as shown in FIG. 21, the second disc cartridge 101 is in the state where the cartridge engagement member 40 is engaged with the holder 106, and the engagement hole 117 and the engagement recessed portion 135 of the tray 107, and is held within the unit body 22 in the state where one end side is projected from the cartridge insertion/withdrawal hole 23.

When user grips the grip portion 134 in this state to draw out the tray 107 in the direction indicated by arrow Y in FIG. 21, the cartridge engagement member 40 is pressed by one side of the engagement recessed portion 135 and is rotated in the direction opposite to the direction indicated by arrow F in FIG. 21 against biasing force of the extension spring 44. As a result, engagement with respect to the engagement recessed portion 135 is released, resulting in the state where it is engaged with only the engagement hole 117 of the holder 106 side. Thus, there results the state where only the holder 106 is held by the cartridge holding plate 24. At this time, engagement between engagement projections 114, 114 and engagement recessed portions 130, 130 relatively engaged so as to integrate the holder 106 and the tray 107 is also released. Thus, only the tray 107 can be moved.

When only the tray 107 is away from the holder 106 and is independently moved, the opening/closing pin 30 is caused to be in contact with the engagement releasing portion 123, whereby the rotational arm 29 rotated against biasing force of the torsion coil spring 32 undergoes biasing force of the torsion coil spring 32, and is rotated in the direction indicated by arrow E in FIG. 21. Further, the rotational arm 29 is rotated in the direction indicated by arrow E in FIG. 23 while allowing the opening/closing pin 30 to undergo pressure-contact with respect to the engagement releasing portion 123 in a manner following further drawing operation in the direction indicated by arrow Y in FIG. 23 of the tray 107.

Figure 23:
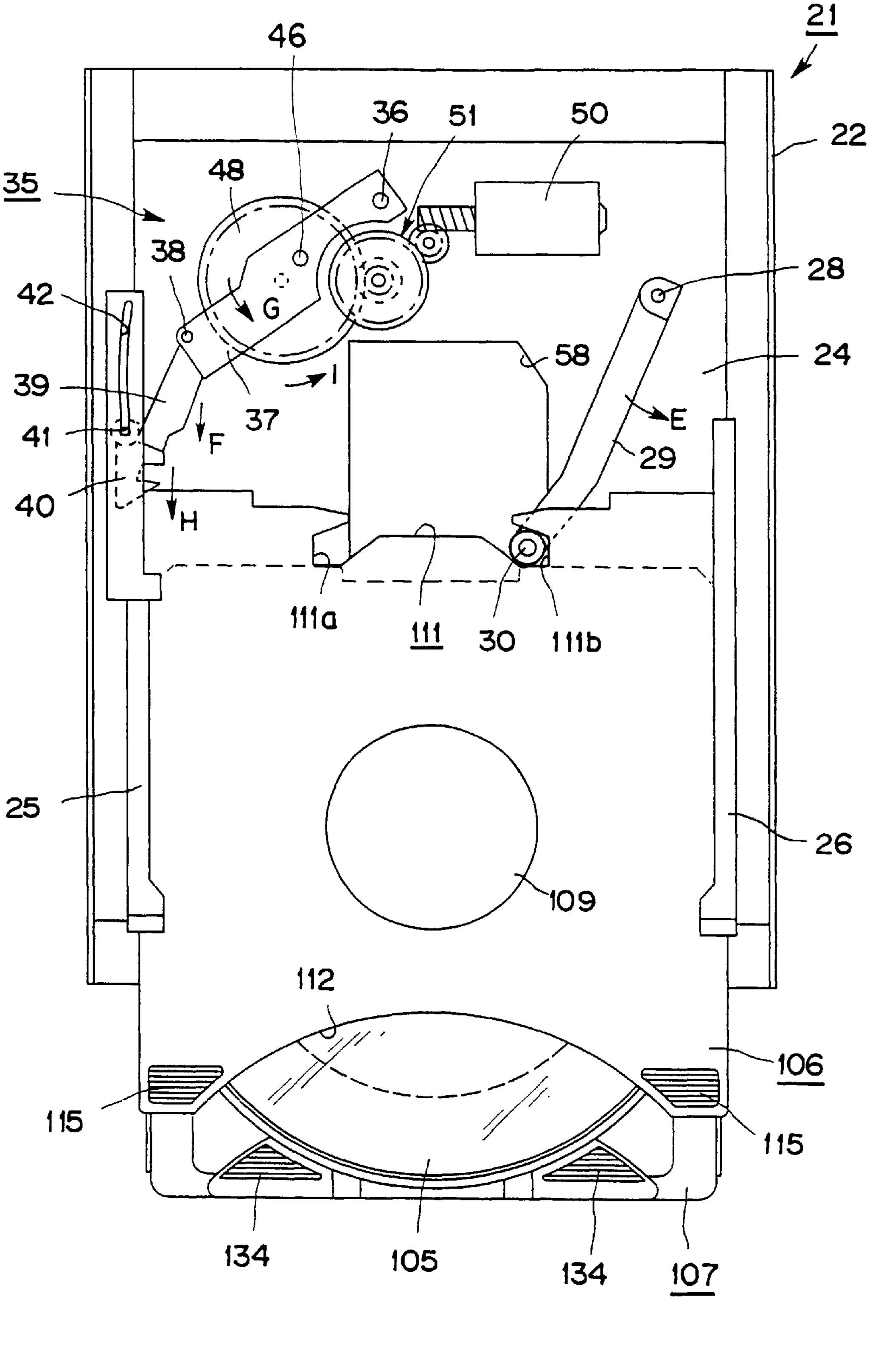
FIG. 23 is a plan view showing the state where tray of the second disc cartridge is drawn out until the middle portion from the disc recording and/or reproducing apparatus.
Figure 24:
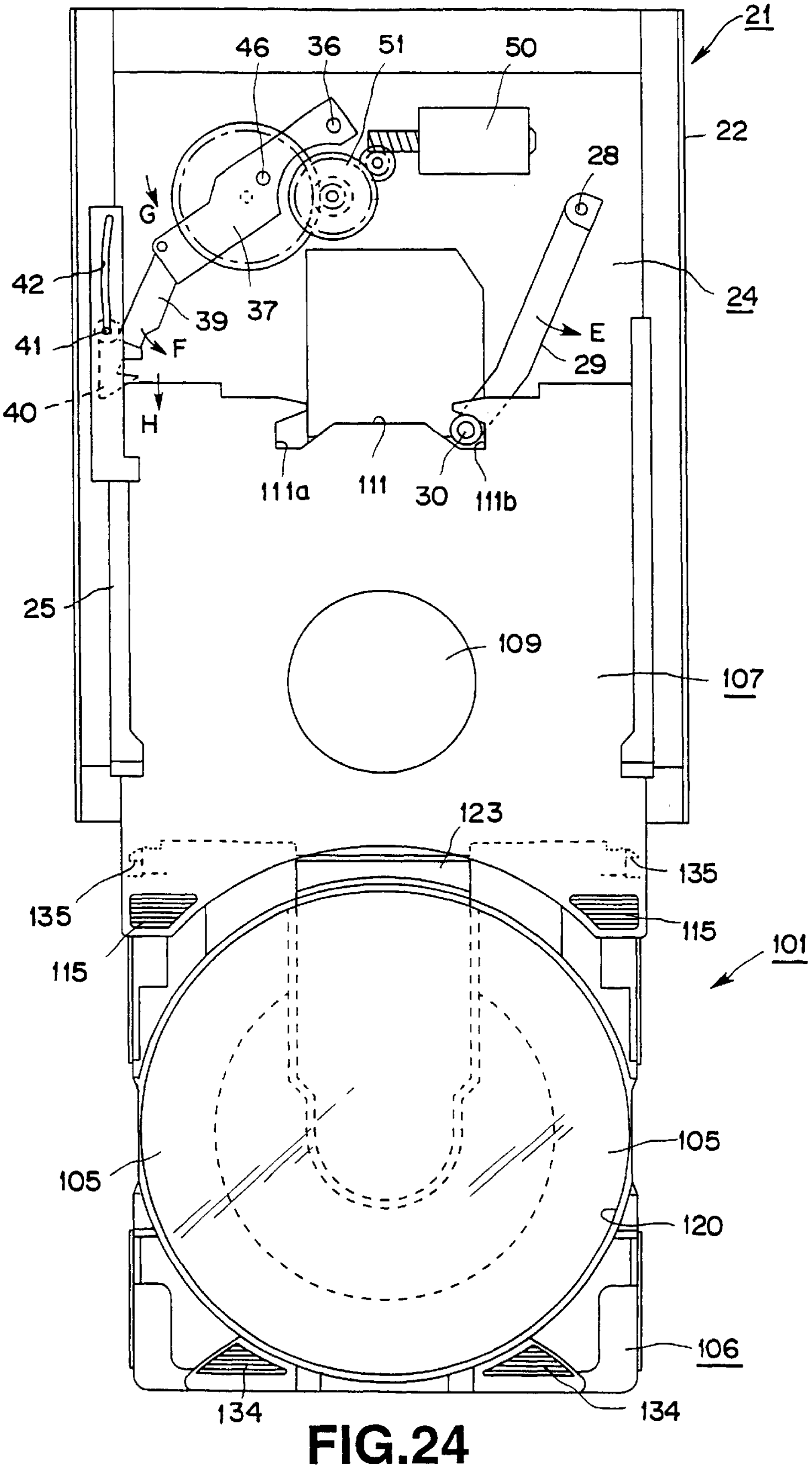
FIG. 24 is a plan view showing the state where the tray is drawn out to the drawing position at which disc can be exchanged.

Further, when the tray 107 is away from the holder 106, and is drawn out toward the external of the unit body 22 in the direction indicated by arrow Y in FIG. 23, and the engagement portion 111 covered by the engagement releasing portion 123 is opened, the opening/closing pin 30 in contact with the engagement releasing portion 123 is admitted into the engagement portion 111. When the tray 107 is further drawn out toward the external of the unit body 22, it is away from the engagement releasing portion 123 of the opening/closing pin 30. At this time, the holder 106 is adapted so that since cartridge engagement member 40 is engaged with the engagement hole 117 and movement is limited and held at insertion position within the unit body 22, the opening/closing pin 30 is engaged with second engagement groove 111*b* of the engagement portion 111.

The holder 106 is adapted so that when the opening/closing pin 30 is engaged with the second engagement groove 111*b*, movement to the unit body 22 in the direction indicated by arrow Y in FIG. 23 is limited by the rotational arm 29, resulting in the state where it is held at insertion position within the unit body 22. Only tray 107 is further drawn out from this time point toward the external of the unit body in the direction indicated by arrow Y in FIG. 23, thereby making it possible to face first and second disc mounting portions 120, 121 toward the external of the unit body 22. Thus, there results the state where exchange of disc 105 mounted on the first or second disc mounting portion 120 or 121 can be made. At this time, the tray 107 is adapted so that engagement projections 126, 126 are caused to collide against striking pieces 113*a*, 113*a*. Thus, drawing operation from the holder 106 is limited, resulting in the state where it is held by the unit body 22.

As stated above, the second disc cartridge 101 according to this invention can carry out exchange of the disc 105 in the state where it is loaded with respect to the disc recording and/or reproducing apparatus 21.

When the tray 107 is inserted into the internal of the unit body 22 after exchange of the disc 105 is carried out, the engagement releasing portion 123 provided at the insertion end side comes into contact with the opening/closing pin 30 engaged with the second engagement groove 111*b* of the engagement portion 111 as shown in FIG. 23. When the tray 107 is further inserted in the direction indicated by arrow X in FIG. 23 of the internal of the unit body 22 from this time point, the opening/closing pin 30 is pressed by the engagement releasing portion 123, and the rotational arm 29 is rotated in the direction opposite to the direction indicated by arrow E in FIG. 23 against biasing force of the torsion coil spring 32. Further, when the tray 107 is inserted into the unit body 22 until the position at which the engagement releasing portion 123 overlaps with the engagement portion 111, the rotational arm 29 is further rotated in the direction opposite to the direction indicated by arrow E in FIG. 23 against biasing force of the torsion coil spring 32 by the engagement releasing portion 123. Thus, the opening/closing pin 30 is detached from the engagement portion 111.

Further, when the tray 107 is inserted into the unit body 22 until the position where the engagement releasing portion 123 overlaps with the engagement portion 111, the cartridge engagement member 40 engaged with the engagement hole 117 of the holder 106 is engaged with the engagement recessed portion 135. As a result, the tray 107 is integrated with the holder 106, and is caused to overlap with the holder 106. Thus, there results second disc cartridge 101 in a form similar to the first disc cartridge 1.

In this case, when the cartridge drawing mechanism 35 is driven, the second disc cartridge 101 is moved to second position close to the side of the disc rotational operation mechanism 55 and the optical pick-up unit 56 in the state held by the cartridge holding plate 24, resulting in the state where recording and/or reproduction of exchanged new disc 105 can be made.

In the case where the second disc cartridge 101 is ejected from the disc recording and/or reproducing unit 21, in the state where the holder 106 and the tray 107 are caused to overlap with each other, and in the state shown in FIG. 21 where a portion of one end side before the second disc cartridge 101 is drawn by the cartridge drawing mechanism 35 is projected from the cartridge insertion/withdrawal hole 23, holder 106 is gripped along with tray 107 through grip portion 115 provided at the holder 106. Further, the holder 106 and the tray 107 are drawn out in the direction indicated arrow Y in FIG. 21, whereby the entire eject operation of the second disc cartridge 101 is carried out.

At this time, since there is the state where the engagement portion 111 is covered by the engagement releasing portion 123, engagement with respect to the holder 106 of the rotational arm 29 is limited, and engagements of the engagement member 40 with respect to the engagement hole 117 of the holder 106 and the engagement recessed portion 135 of the tray 107 are released at the same time followed by movement of the holder 106 and the tray 105.

It is to be noted while the above-described second disc cartridge 101 according to this invention is of a structure in which tray 7 is movably held with respect to the holder 6, there may be employed a configuration in which extending slider 158 is disposed for the purpose of ensuring movement quantity of the tray 7 drawn out with respect to the holder 6 so that it has large value.

Another example of the second disc cartridge according to this invention provided with extending slider 158 will now be described with reference to FIG. 25. It is to be noted that since this disc cartridge 102 is substantially common to the basic configuration of the above-described disc cartridge 101, the same reference numerals are respectively attached to the same portions and the detailed explanation will be omitted.

Figure 25:
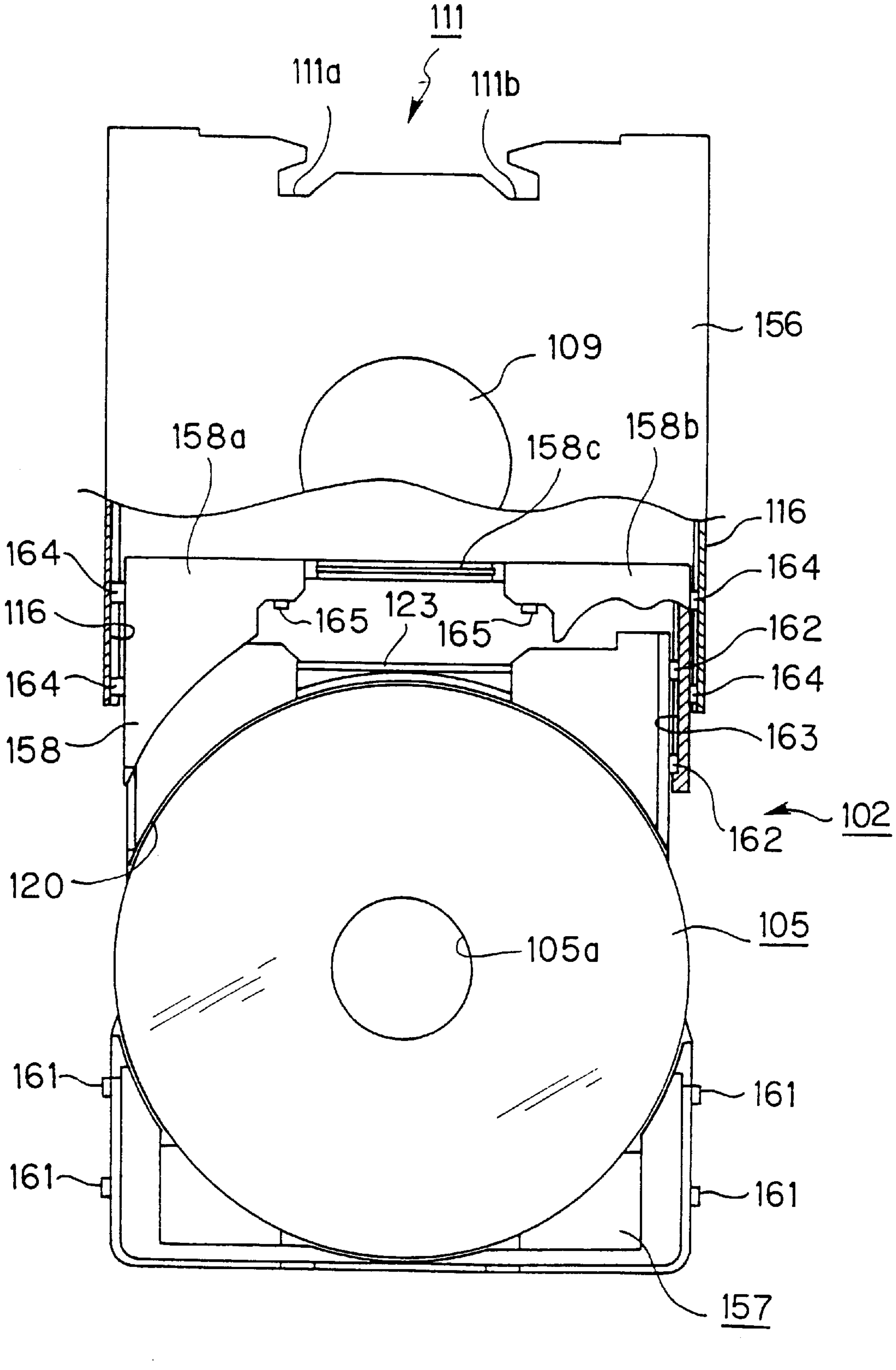
FIG. 25 is a plan view showing the state where another example of second disc cartridge according to this invention is shown and tray is drawn out from the holder.

As shown in FIG. 25, the second disc cartridge 102 comprises a holder 156 for covering first and second disc mounting portions 120, 121 provided at the tray 157, the tray 157 movably disposed with respect to this holder 156 and adapted so that disc 105 is mounted, and an extending slider 158 for increasing drawing movement quantity of the tray 157 with respect to the holder 56.

Figure 26:
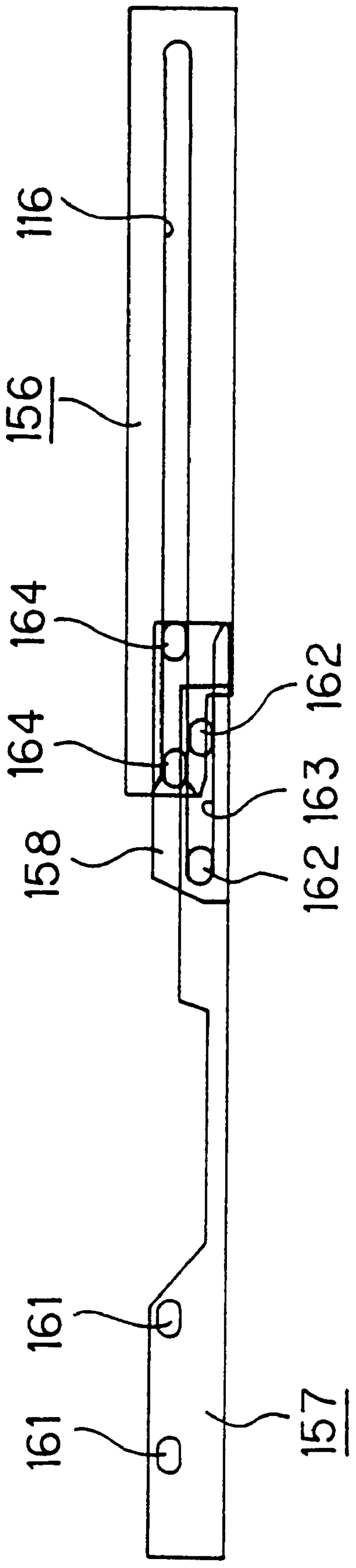
FIG. 26 is a side view of the second disc cartridge showing the state where tray is drawn out from holder.

At both sides in parallel to insertion direction with respect to the holder 156 of the tray 157, there are provided respective pairs of projection portions 161, 161 and 162, 162 as shown in FIGS. 25 and 26. The tray 157 is adapted so that respective projecting portions 161, 161 are engaged with guide grooves 116 of the holder 156. The extending slider 158 is composed of a pair of supporting portions 158*a*, 158*b* movably supported by the holder 156 and for movably supporting the tray 157, and a connecting portion 158*c* which connects these supporting portions 158*a*, 158*b*. At these supporting portions 158*a*, 158*b*, there are respectively provided parallel guide grooves 163, 163 in the insertion/withdrawal direction with respect to the disc recording and/or reproducing unit 21 at the internal surface side of the side surfaces opposite to each other in parallel to movement direction. Other projection portions 162, 162 of tray 57 are respectively movably engaged with respect to these guide grooves 163, 163.

Moreover, projection portions 164, 164 for guide are respectively integrally formed in a projected manner at the side surface of the external side at the supporting portions 158*a*, 158*b*. These projection portions 164, 164 for guide are respectively inserted through guide grooves 116, 116 of the tray 57 so that they can be move. Further, at supporting portions 158*a*, 158*b*, at one end surface opposite to the tray 157, there are projected striking portions 165, 165 where end surface of the insertion side into the disc recording and/or reproducing unit 21 of the tray 157 is struck Moreover, at one surface sides of supporting portions 158*a*, 158*b*, although not shown, guide projections are integrally formed and are movably engaged with guide grooves formed at one surface side of the holder 156. Further, at the other surface side of supporting portions 158*a*, 158*b*, although not shown, guide grooves are formed and guide projections integrally projected on one surface of the tray 157 are movably engaged with these guide grooves. A connection portion 158*c* is integrally formed over these supporting portions 158*a*, 158*b* so as to connect respective supporting portions 158*a*, 158*b*.

It is to be noted that length of the extending slider 158 is suitably set by taking into consideration drawing quantity, etc. from the unit body 22 of the tray 157 in the state where the second disc cartridge 102 is held by the disc recording and/or reproducing unit 21.

The operation of the tray 157 and the extending slider 158 with respect to the holder 156 will be described with reference to FIGS. 27 and 28 in connection with the second disc cartridge 102 constituted as described above.

As shown in FIG. 26, when the tray 157 is drawn with respect to the holder 156, this disc cartridge 102 is adapted so that respective projection portions 161, 161 of the tray 157 and projection portion 164 of the extending slider 158 are moved along the guide groove 116 of the holder 156, and projection 162 of the tray 157 is moved along the guide groove 163 of the extending slider 158, whereby the tray 157 is drawn out. Namely, the disc cartridge 102 is adapted so that the tray 157 and the extending slider 158 are caused to undergo movement operation in a manner interlocking therewith with respect to the holder 156.

Figure 27:
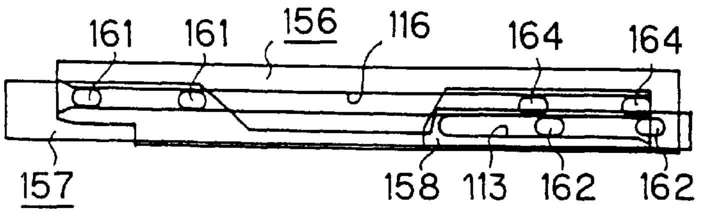
FIG. 27 is a side view of the second disc cartridge showing the state where tray is inserted into the holder.

Further, when after disc 105 mounted on the tray 157 is exchanged, this disc cartridge 102 is adapted so that when tray 157 is thrust with respect to the holder 156 as shown in FIG. 27, projection portion 162 of tray 157 is caused to collide against one end portion of guide groove 163 of extending slider 158, and the extending slider 158 is moved with respect to holder 156 along with the tray 157 and is thrust thereinto. Further, the tray 157 is adapted so that projection portion 161 is engaged with opening end of guide groove 116 of the holder 156.

In accordance with the above-described second disc cartridge 102, when the extending slider 158 is provided to thereby exchange the disc 105 in the state where holder 156 is held by the disc recording and/or reproducing unit 21, movement quantity of the tray 157 drawn out with respect to the holder 156 can be increased. Thus, exchange of the disc 105 becomes more easy.

Moreover, while the above-described second disc cartridge 102 uses single extending slider 158, extending slider divided into plural portions may be used.

Other second disc cartridge 103 respectively having first and second extending sliders 178, 179 will be explained with reference to FIG. 28.

It is to be noted that since the second disc cartridge 103 shown here is substantially common to the basic configuration of the above-described second disc cartridge 102, the same reference numerals are respectively attached to the same members, and the detailed explanation is omitted.

Figure 28:
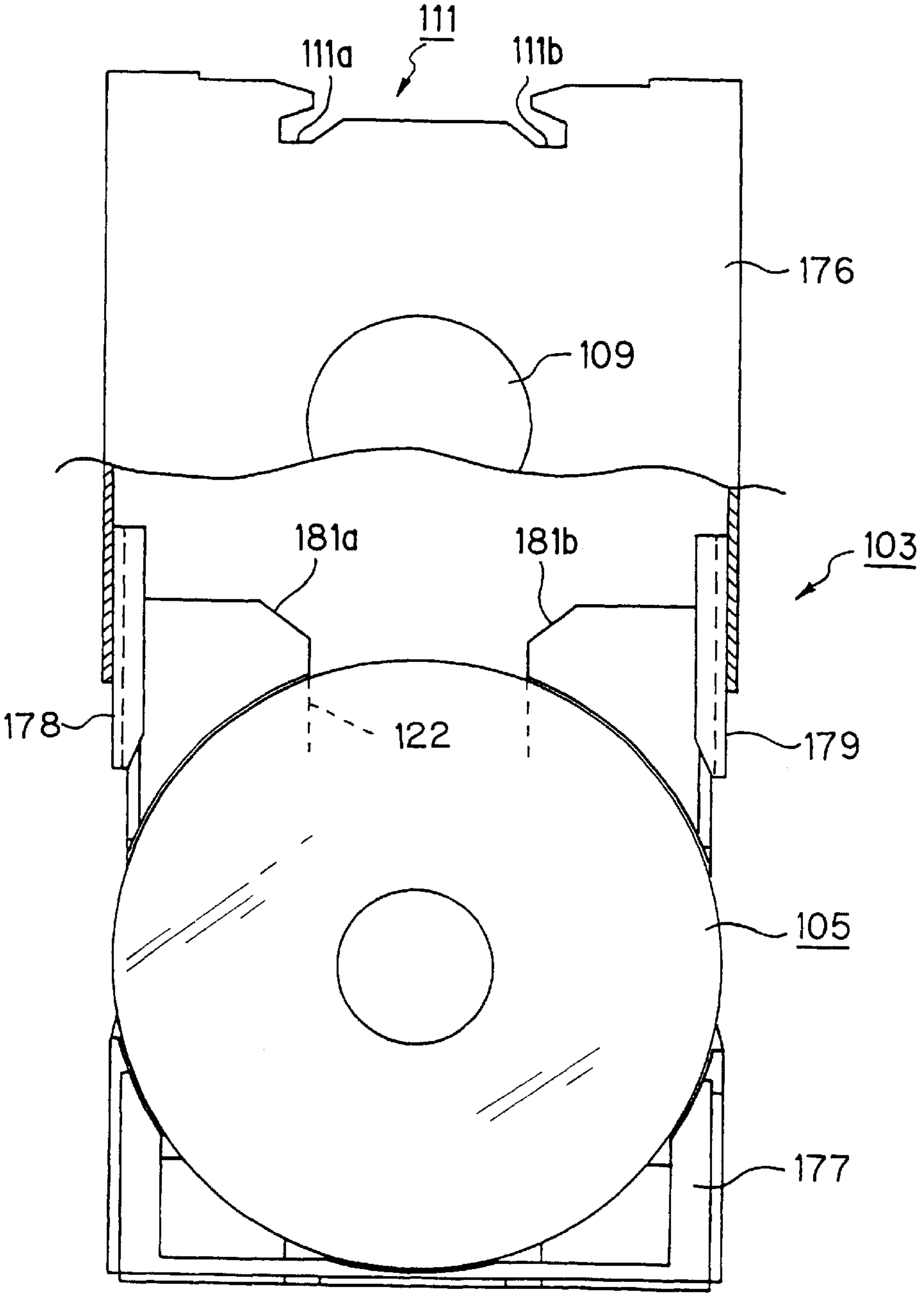
FIG. 28 is a plan view showing the state where a further example of second disc cartridge according to this invention is shown, and showing the state where tray is drawn out from the holder.

As shown in FIG. 28, the second disc cartridge 103 comprises a holder 176 for covering first and second disc mounting portions 120, 121 provided at the tray 177, and a first extending slider 178 and a second extending slider 179 which extend drawing quantity of tray 177 with respect to the holder 176.

As shown in FIG. 28, at the tray 177, engagement releasing portions 181*a*, 181*b* for releasing engagement with respect to rotational arm 29 of the disc recording and/or reproducing unit 21 engaged with engagement portion 111 of the holder 176 are respectively formed, in the state positioned at the insertion end side into the disc recording and/or reproducing unit 21, and in a manner adjacent to the recording and/or reproducing opening portion 122.

The first extending slider 178 and the second extending slider 179 are movably supported by the holder 176 through guide groove and projecting portion (not shown) provided at the side surface in parallel to movement direction, and movably support the tray 177.

It is to be noted that while respective second disc cartridges 101, 102, 103 according to this invention are adapted so that clamping member 109 is provided at holders 106, 156, 176, the clamping member 109 is not necessarily required.

In addition, the second disc cartridge according to this invention is not limited to the optical disc as disc, but it is a matter of course that this invention can be applied to other disc-shaped optical recording media such as magneto-optical disc, etc.

INDUSTRIAL APPLICABILITY

As described above, the disc cartridge according to this invention is permitted to undergo loading as it is with respect to the disc recording and/or reproducing unit in which disc cartridge conventionally used is caused to undergo loading, and exchange of disc accommodated in the state where it is held by the disc recording and/or reproducing apparatus can be carried out.

What is claimed is:

1. A disc cartridge for loading into a recording and/or reproducing apparatus and having a disc serving as a recording medium of information signals accommodated therein and an open portion for allowing a portion of the disc to be faced toward an exterior of the recording and/or reproducing apparatus along a radial direction, the disc cartridge comprising:

a holder provided with an engagement portion for engaging shutter opening means provided in the recording and/or reproducing apparatus, the engagement portion being positioned at an insertion end side of the recording and/or reproducing apparatus; and a tray provided with a disc mounting portion whereon the disc serving as the recording medium of information signals is mounted at one surface side covered by the holder, and wherein the tray is adapted for moving when the engagement portion is engaged with the shutter opening means, so that the tray is drawn from the recording and/or reproducing apparatus with the holder held by the shutter opening means.

2. The disc cartridge as set forth in claim 1, wherein the tray includes releasing means for releasing engagement of the engagement portion of the holder with the shutter opening means at the insertion end side of the recording and/or reproducing apparatus.

3. The disc cartridge as set forth in claim 1, wherein the engagement portion includes a first engagement recessed portion and a second engagement recessed portion symmetrically formed with respect to a center line parallel to a movement direction of the tray.

4. The disc cartridge as set forth in claim 2, wherein the releasing means is adapted for releasing engagement of the engagement portion of the holder with the shutter opening means when the tray is moved to a position where the disc mounting portion is covered by the holder.

5. The disc cartridge as set forth in claim 1, further comprising:

an engagement hole for engaging holding means provided in the recording and/or reproducing apparatus, the engagement hole being positioned at one side of an insertion end side of the holder; and an engagement recessed portion for communicating with the engagement hole so that the holding means is engaged when the holder and the tray overlap with each other so that the disc mounting portion is covered by the holder.

6. The disc cartridge as set forth in claim 1, wherein the tray includes an open portion for allowing disc rotational means and recording and/or reproducing means disposed in the recording and/or reproducing apparatus to be faced toward the insertion end side of the recording and/or reproducing apparatus.

7. The disc cartridge as set forth in claim 6, wherein the holder includes a clamping member for clamping the disc mounted on the disc mounting portion of the tray in cooperation with the disc rotational means disposed in the recording and/or reproducing apparatus.

8. The disc cartridge as set forth in claim 1, wherein the tray includes, at an outer periphery of the disc mounting portion, a plurality of disc supporting members adapted for being subjected to rising and setting with respect to the outer periphery of the disc mounting portion and for supporting the disc mounted on the disc mounting portion.

9. The disc cartridge as set forth in claim 1, further comprising guide means for guiding movement of the tray relative to the holder.

10. The disc cartridge as set forth in claim 9, wherein the guide means comprises:

rail portions formed on the tray at a pair of side surfaces opposite to each other in parallel to a movement direction of the tray;

a pair of side walls formed on the holder respectively opposite to the pair of side surfaces; and guide grooves formed on the holder for engaging the rail portions.

11. The disc cartridge as set forth in claim 1, wherein, between the holder and the tray, there is provided slipping off prevention means for preventing the tray from slipping off the holder when the tray is drawn up to a position where the disc mounting portion covered by the holder is permitted to undergo loading/unloading of the disc.

12. The disc cartridge as set forth in claim 11, wherein the slipping off prevention means comprises:

projections respectively formed at one surface where the disc mounting portion is formed and at a surface covering the disc mounting portion; and guide grooves having a closed end side engaged with the projections.

13. The disc cartridge as set forth in claim 1, wherein, between the holder and the tray, there is provided movement limiting means for limiting relative movement between the holder and the tray when the holder and the tray overlap with each other at a position for covering the disc mounting portion.

14. The disc cartridge as set forth in claim 1, wherein the tray includes a grip portion for permitting gripping of the holder at one end side opposite to the insertion end side of the recording and/or reproducing apparatus.

15. The disc cartridge as set forth in claim 1, wherein the holder includes, at one end side opposite to insertion end side of the recording and/or reproducing apparatus, a grip portion for permitting gripping of the holder and the tray when the holder and the tray overlap with each other at a position for covering the disc mounting portion.

16. The disc cartridge as set forth in claim 1, wherein the tray is supported by the holder through extending means supported by the holder.

17. The disc cartridge as set forth in claim 16, wherein the extending means are disposed at sides opposite to each other and parallel to a movement direction of the tray.

* * * * *